(12) United States Patent
Kawarai et al.

(10) Patent No.: US 7,366,165 B2
(45) Date of Patent: Apr. 29, 2008

(54) INPUT LINE INTERFACE DEVICE AND PACKET COMMUNICATION DEVICE

(75) Inventors: Kenichi Kawarai, Kawasaki (JP);
Masakatsu Nagata, Kawasaki (JP);
Hiroshi Tomonaga, Kawasaki (JP);
Naoki Matsuoka, Kawasaki (JP);
Tsuguo Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 991 days.

(21) Appl. No.: 10/079,082

(22) Filed: Feb. 19, 2002

(65) Prior Publication Data

US 2002/0122424 A1    Sep. 5, 2002

(30) Foreign Application Priority Data

Mar. 5, 2001    (JP) ............................. 2001-060617

(51) Int. Cl.
*H04Q 11/00*    (2006.01)
(52) U.S. Cl. ...................... 370/366; 370/235; 370/394; 370/536
(58) Field of Classification Search ................ 370/230, 370/235, 366, 389, 394, 395.52, 474, 536, 370/543, 544
See application file for complete search history.

(56) References Cited

U.S. PATENT DOCUMENTS

| 5,680,400 | A  | * | 10/1997 | York ........................... 370/473 |
| 6,052,368 | A  | * | 4/2000  | Aybay ......................... 370/357 |
| 6,081,523 | A  | * | 6/2000  | Merchant et al. ........... 370/389 |
| 6,614,808 | B1 | * | 9/2003  | Gopalakrishna ............ 370/469 |
| 6,618,383 | B1 | * | 9/2003  | Tomlins .................... 370/395.5 |
| 6,658,003 | B1 | * | 12/2003 | Sugai et al. ................ 370/392 |
| 6,768,716 | B1 | * | 7/2004  | Abel et al. .................. 370/230 |

FOREIGN PATENT DOCUMENTS

JP    02284542    11/1990

* cited by examiner

*Primary Examiner*—Chi Pham
*Assistant Examiner*—Donald L Mills
(74) *Attorney, Agent, or Firm*—Katten Muchin Rosenman LLP

(57) ABSTRACT

An input line interface device that is used to accommodate packets from a high-speed line efficiently and to reduce a processing load on a back stage caused by routing control. A packet allotting section divides a variable-length packet, allots divided packets to parallel lines, and outputs the packets. A flow group classifying section classifies the packets into flow groups on each of the parallel lines. A sequence number giving section gives the packets sequence numbers corresponding to or independent of the flow groups. A buffering section stores the packets to which the sequence numbers have been given in a buffer or reads out them from the buffer to exercise sequence control over the packets in the flow groups. A flow separating switch separates the packets according to the flow groups and outputs the packets.

11 Claims, 27 Drawing Sheets

| | #1 | #2 | #3 | | | | | |
|---|---|---|---|---|---|---|---|---|
| COUNT VALUE FOR READING OUT PACKET OF FG1 | 1 | 2 | 3 | 4 | 5 | 6 | 7 | 8 |
| COUNT VALUE FOR READING OUT PACKET OF FG2 | i | ii | iii | iii | iii | iv | v | v |
| COUNT VALUE FOR READING OUT PACKET OF FG3 | a | b | c | c | c | c | c | c |
| COUNT VALUE FOR READING OUT PACKET OF FG4 | A | B | C | D | E | F | F | F |

141 READ CONTROL MEANS

FIG. 11

INPUT LINE INTERFACE DEVICE AND PACKET COMMUNICATION DEVICE

BACKGROUND OF THE INVENTION (1) Field of the Invention

This invention relates to an input line interface device and packet communication device and, more particularly, to an input line interface device for exercising interface control over packets on the input line side and a packet communication device for exercising communication control over packets.

(2) Description of the Related Art

With the rapid spread of the Internet, there has been a sharp increase in demand for IP (Internet protocol) traffic in recent years. Therefore, it is hoped that a high-speed large-capacity routing unit will be realized.

With conventional packet routing techniques, first a received packet is temporarily stored in a buffer in an input line section. Then a table prepared in advance is searched for an output route with an identifier in the packet as a key. And then the packet read from the buffer on the basis of output route information obtained is switched in a packet switching section and is sent to the appropriate output route.

With the above conventional packet routing techniques, packets have been processed in parallel in a plurality of packet processing sections. However, packet length is variable, so processing time in packet processing sections will differ. Routing IP traffic therefore can reverse the order of packets.

With the progress of optical multiplexing technologies, such as WDM, line speed is improving year by year. In addition, advanced packet processing relating to Layer 3 is needed. Therefore, providing a routing unit suitable for a high line speed and the diversity of networks is essential for realizing multimedia communication networks.

SUMMARY OF THE INVENTION

The present invention was made under the background circumstances as described above. An object of the present invention is to provide an input line interface device that efficiently accommodates packets sent via high-speed lines and reduces a processing load on a back stage caused by routing control.

Another object of the present invention is to provide a packet communication device for performing a high-speed large-capacity routing process.

In order to achieve the first object described above, an input line interface device for exercising interface control over packets on the input line side is provided. This input line interface device comprises packet allotting means for dividing a variable-length packet, allotting divided packets to parallel lines, and outputting the packets, flow group classifying means for classifying the packets into flow groups on each of the parallel lines, sequence number giving means for giving the packets sequence numbers corresponding to or independent of the flow groups, buffering means for buffering the packets to which the sequence numbers have been given to exercise sequence control over the packets in the flow groups, and a flow separating switch for separating the packets according to the flow groups and outputting the packets.

In order to achieve the second object described above, a packet communication device for exercising communication control over packets is provided. This packet communication device comprises an input line interface section including packet allotting means for dividing a variable-length packet, allotting divided packets to parallel lines, and outputting the packets, flow group classifying means for classifying the packets into flow groups on each of the parallel lines, sequence number giving means for giving the packets sequence numbers corresponding to or independent of the flow groups, buffering means for buffering the packets to which the sequence numbers have been given to exercise sequence control over the packets in the flow groups, and a flow separating switch for separating the packets according to the flow groups and outputting the packets, a packet processing section for processing the input packets of the same flow group, a switching section for exercising switching control to output to output lines, and an output line interface section including queue control means for queuing packets on which a switching process has been performed in order to maintain the quality of the packets in the flow groups and merging means for merging the packets and outputting the packets to the output lines.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 is a view showing the read operation of read control means.

DESCRIPTION OF THE PREFERRED EMBODIMENTS

Figure 1:
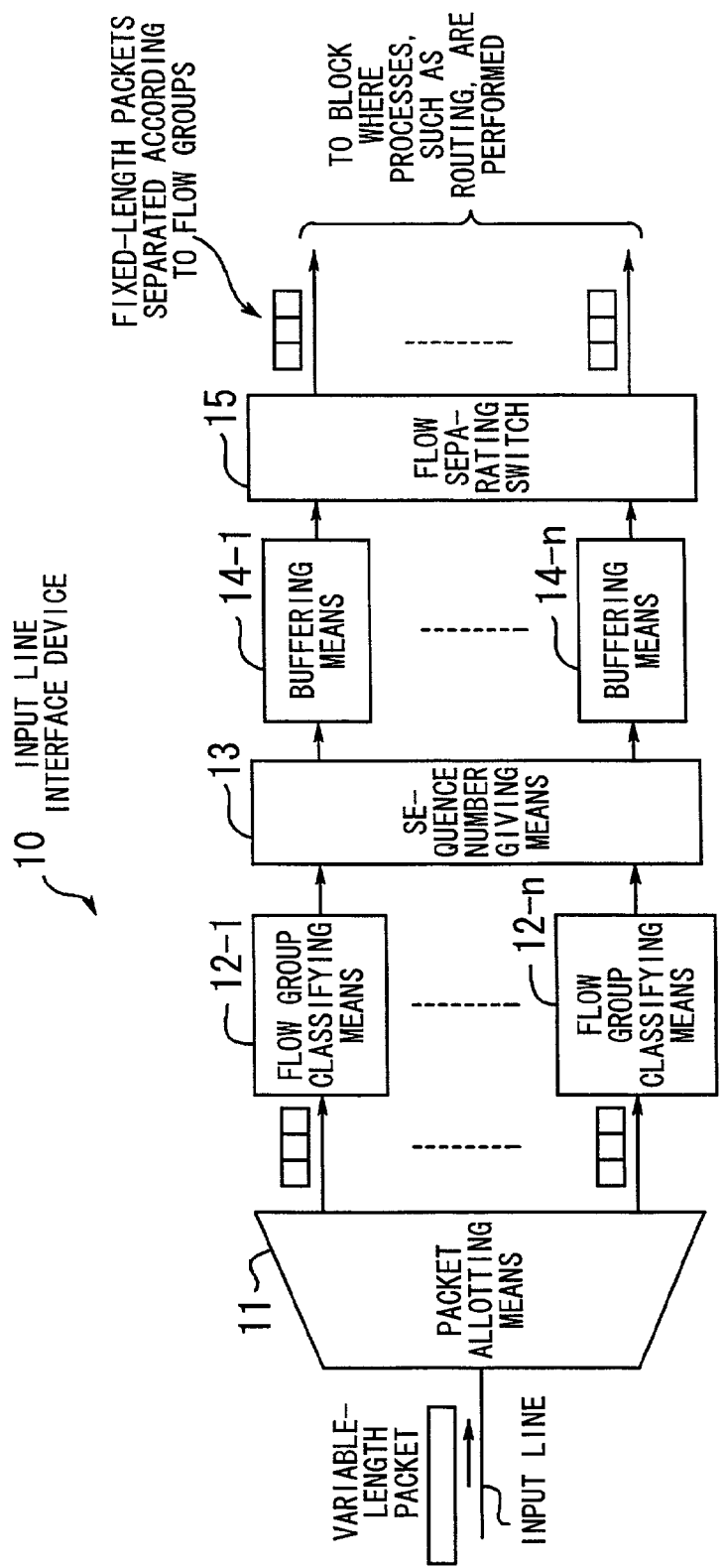
FIG. 1 is a view for describing the principles underlying an input line interface device according to the present invention.

Embodiments of the present invention will now be described with reference to the drawings. FIG. 1 is a view for describing the principles underlying an input line interface device according to the present invention. An input line interface device 10 exercises interface control over packets on the input line side and then sends the packets to a block where packet processing, such as routing, relating to Layer 3 is performed. The input line interface device 10 according to the present invention accommodates high-speed large-capacity input lines efficiently.

Packet allotting means 11 divides a variable-length packet, allots divided packets to parallel lines, and outputs them. Flow group classifying means 12-1 through 12-n (collectively referred to as "flow group classifying means 12") classify packets into flow groups on each parallel line. In this case, the flow group classifying means 12-1 through 12-n classify input packets into flow groups by the use of a hash function. A flow group is a set formed in the case of dividing a plurality of packet flows (described later in FIG. 3).

Sequence number giving means 13 gives packets sequence numbers corresponding to flow groups. Alternatively, the sequence number giving means 13 gives packets sequence numbers independently of flow groups.

Buffering means 14-1 through 14-n (collectively referred to as "buffering means 14") control the buffering (store and read) of packets to which sequence numbers have been given, and exercises sequence control over packets in flow groups. That is to say, the buffering means 14-1 through 14-n exercise sequence control so that the order of packets in packet flows will not be reversed. A flow separating switch 15 separates packets according to flow groups and outputs them.

For example, the packet allotting means 11 divides a flow of packets transmitted at the rate of 40 Gb/s into fixed-length packets, allots them to four parallel lines (10 Gb/s per parallel line), and outputs them. The flow group classifying means 12-1 through 12-4 have a throughput of 10 Gb/s and classifies the packets into four flow groups by performing a hash process.

The sequence number giving means 13 gives the packets sent from the flow group classifying means 12-1 through 12-4 sequence numbers according to flow groups. The buffering means 14-1 through 14-4 store the packets according to flow groups and reads them on the basis of their sequence numbers. The flow separating switch 15 separates the packets according to the flow group and sends them to a processing block located behind it.

Figure 2:
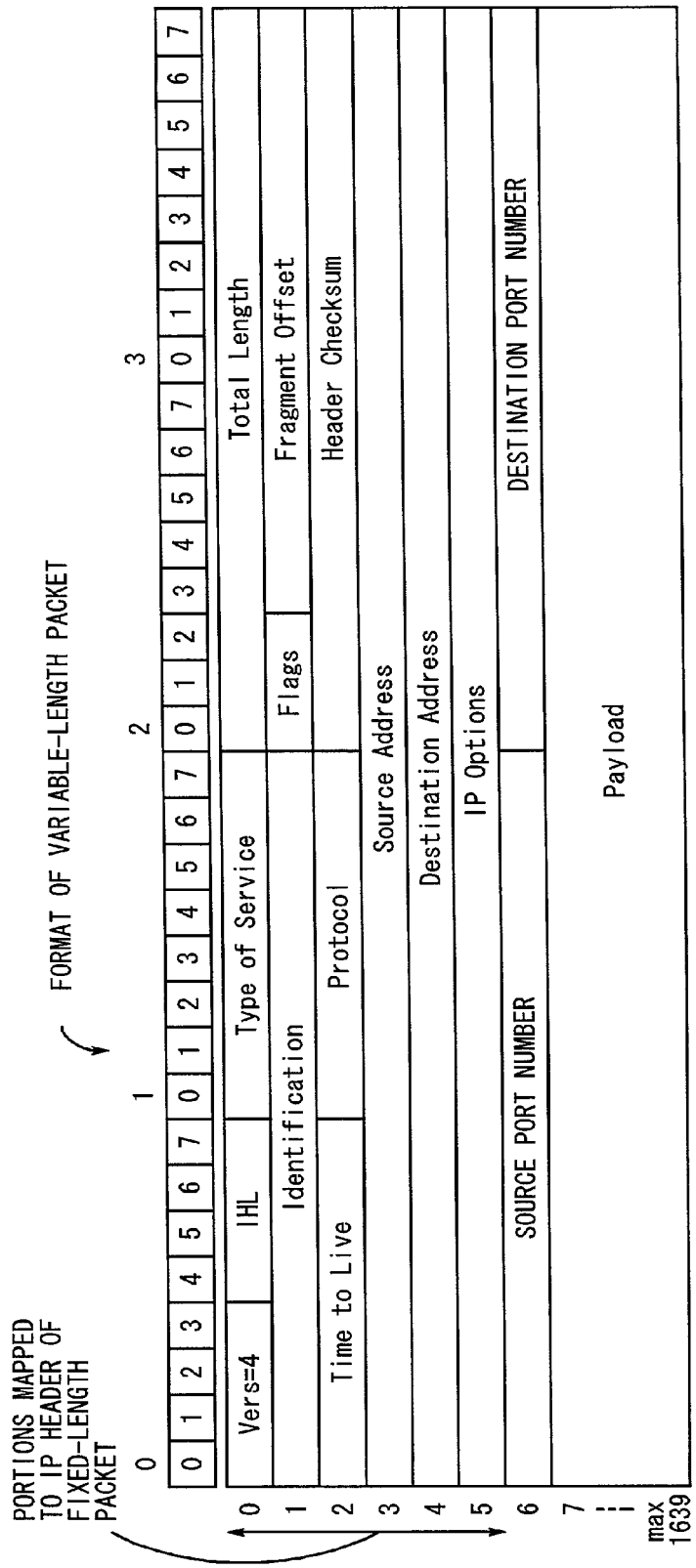
FIG. 2 is a view showing the structure of a variable-length packet.

The structure of a variable- and fixed-length packet will now be described. FIG. 2 is a view showing the structure of a variable-length packet. A variable-length packet has the IPv4 format generally used. However, other frame formats, such as the IPv6 format, may be used if a packet includes the same information elements.

In FIG. 2, Vers, IHL, Type of Service (TOS), Total Length, Identification, Flags, Fragment Offset, Time to Live, Protocol, Header Checksum, Source Address, Destination Address, and Payload indicate a version number, header length, priority, IPv4 payload length, fragment ID, a flag, a fragment offset, a time limit on a hop, a protocol identifier, checksum, a source address, a destination address, and a payload respectively.

Figure 3:
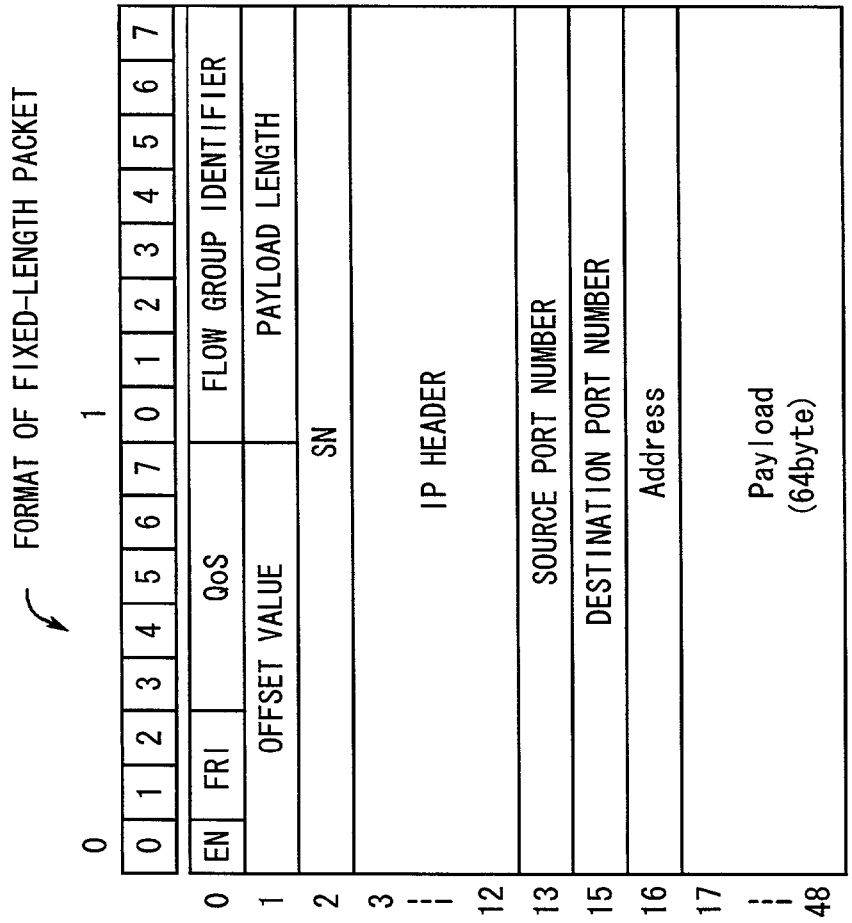
FIG. 3 is a view showing the structure of a fixed-length packet.

FIG. 3 is a view showing the structure of a fixed-length packet. In the present invention, part of the payload portion of the variable-length packet shown in FIG. 2 is partitioned off to form the format of a fixed-length (64-byte, for example) packet shown in FIG. 3. However, there is no limit to the length or arrangement of information as long as the same information elements are included.

Each field in a fixed-length packet will now be described. The values of the IP Header, Source Port Number, and Destination Port Number fields in FIG. 3 are obtained by mapping those of the variable-length packet. To reduce the amount of header data, only necessary information elements are extracted in the case of mapping.

EN is used to identify the validity of a packet. If there is no valid packet to be output, an empty packet (EN=0) will be output.

FRI is a frame type which indicates the position of a fixed-length packet in a variable-length packet at the time of the variable-length packet being divided into fixed-length packets. This information is used to reassemble fixed-length packets into the original variable-length packet. For example, the FRI value of 00 indicates that this fixed-length packet was in the middle of the original variable-length packet. The FRI values of 01, 10, and 11 indicate that this fixed-length packet was at the start, at the end, and at the start and end, respectively, of the original variable-length packet.

QoS (Quality of Service) is used at a back stage to exercise control relating to QoS. This field will be filled in on the basis of results obtained by referring to the TOS field in IP Header. The flow group classifying means 12 performs a hash operation with a source address, destination address, protocol identifier, source port number, and destination port number as keys and fills in the Flow Group Identifier field with the operation results.

Offset Value indicates the start position of a valid field for payload information in a fixed-length packet. Payload Length indicates the length of the valid field from that start position. SN is a field filled in with a sequence number. Address is used to specify a memory address where a payload separated from header information included in a variable-length packet was written (described later in FIG. 6).

A packet flow consists of packets which have the same values in each of the Protocol, Source Address, Destination Address, Source Port Number, and Destination Port Number fields. It is assumed that there are packets Pa, Pb, and Pc having the same values in each of the Protocol, Source Address, Source Port Number, and Destination Port Number fields and that only packets Pa and Pb have the same values in the Destination Address field. Then packets Pa and Pb form the same packet flow.

Figure 4:
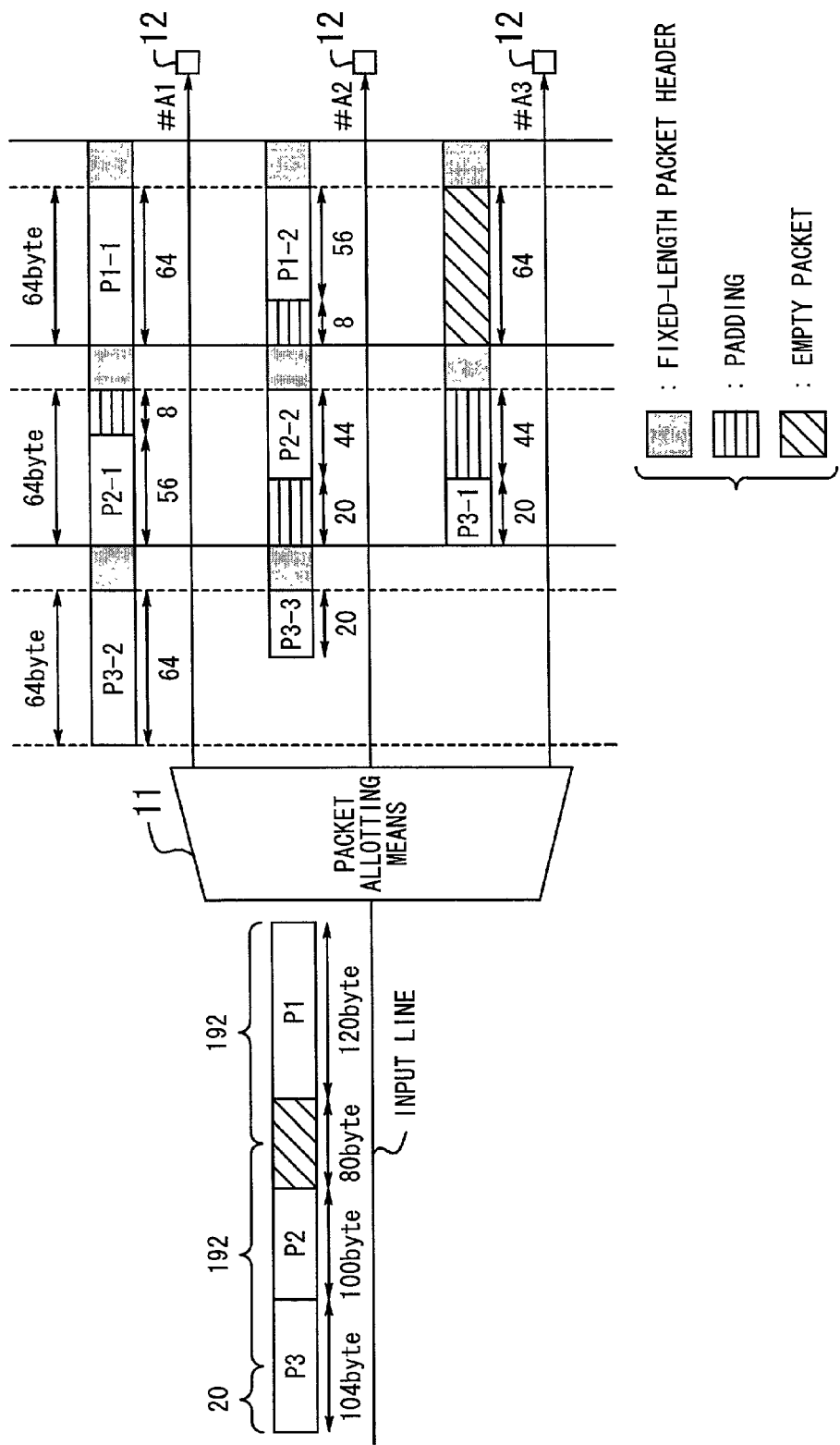
FIG. 4 is a view showing the operation of packet allotting means.

The packet allotting means 11 will now be described. FIG. 4 is a view showing the operation of the packet allotting means 11. In FIG. 4, when a variable-length packet arrives at the packet allotting means 11, the packet allotting means 11 divides it into fixed-length packets and performs an allotting process by changing destinations in a constant cycle (time division allotting process).

When a variable-length packet arrives, the packet allotting means 11 extracts information from the header portion of the packet and generates header information for fixed-length packets. Then the packet allotting means 11 divides the variable-length packet at constant time slot intervals, adds the header information for fixed-length packets to divided packets, allots them to routes, and outputs them. In this example, a variable-length packet is divided at intervals of 64 bytes and generated fixed-length packets are allotted to three routes. These fixed-length packets will be output to the flow group classifying means 12 on each route.

In a time division allotting process, whether a packet which has arrived at the packet allotting means 11 is valid or invalid, a packet flow is first divided into packets of (the number of output routes×divide time slot). Divided packets are divided again by the number of the output routes and are allotted to the output routes.

In this example, the number of output routes is three and a divide time slot is 64 bytes. Therefore, a packet flow is first divided with 192 (=64×3) bytes as a unit. In addition, these 192 bytes are divided in three, that is to say, with 64 bytes as a unit and are allotted in order to the output routes in a constant cycle.

Therefore, in this example, packet P1 of 120 bytes and an empty packet of 72 bytes (a total of 192 bytes) are divided in three, that is to say, with 64 bytes as a unit and a fixed-length packet header is added (hereinafter descriptions of the addition of a fixed-length packet header will be omitted). Packet P1-1 of 64 bytes, packet P1-2 of 56 bytes and padding (empty data used to pad empty area to generate a fixed-length packet) of 8 bytes, and an empty packet of 64 bytes are allotted to output routes #A1, #A2, and #A3 respectively.

Next, with an empty packet of 8 bytes, packet P2 of 100 bytes, and packet P3 of 84 bytes (a total of 192 bytes), padding of 8 bytes and packet P2-1 of 56 bytes, packet P2-2 of 44 bytes and padding of 20 bytes, padding of 44 bytes and packet P3-1 of 20 bytes, and packet P3-2 of 64 bytes are allotted to output routes #A1, #A2, #A3, and #A1 respectively. Packet P3-3 of the remaining 20 bytes is allotted to output route #A2.

It is assumed that a packet other than the one on which allotting is currently being performed arrives during an allotting process. Then, if there is an empty area, it will be filled in with padding. The former packet will be allotted to another route. In this example, packet P2 ends with packet P2-2. Therefore, packet P2-2 is allotted to output route #A2, the empty area is filled in with padding, and packet P3 (packet P3-1) is allotted to output route #A3.

Packet P3-1 is allotted after the padding of 44 bytes, not directly after a fixed-length packet header. This relates to an internal process in the packet allotting means 11. For example, it is assumed that after packet P2-2 of 44 bytes is written to an internal buffer in the packet allotting means 11, packet P3-1 of 20 bytes is written. In that case, the position where packet P3-1 will be written is just behind the one where packet P2-2 was written. That is to say, packet P3-1 is not written to the leading position of the internal buffer after packet P2-2 being allotted. Therefore, packet P3-1 is allotted after the padding of 44 bytes.

Figure 5:
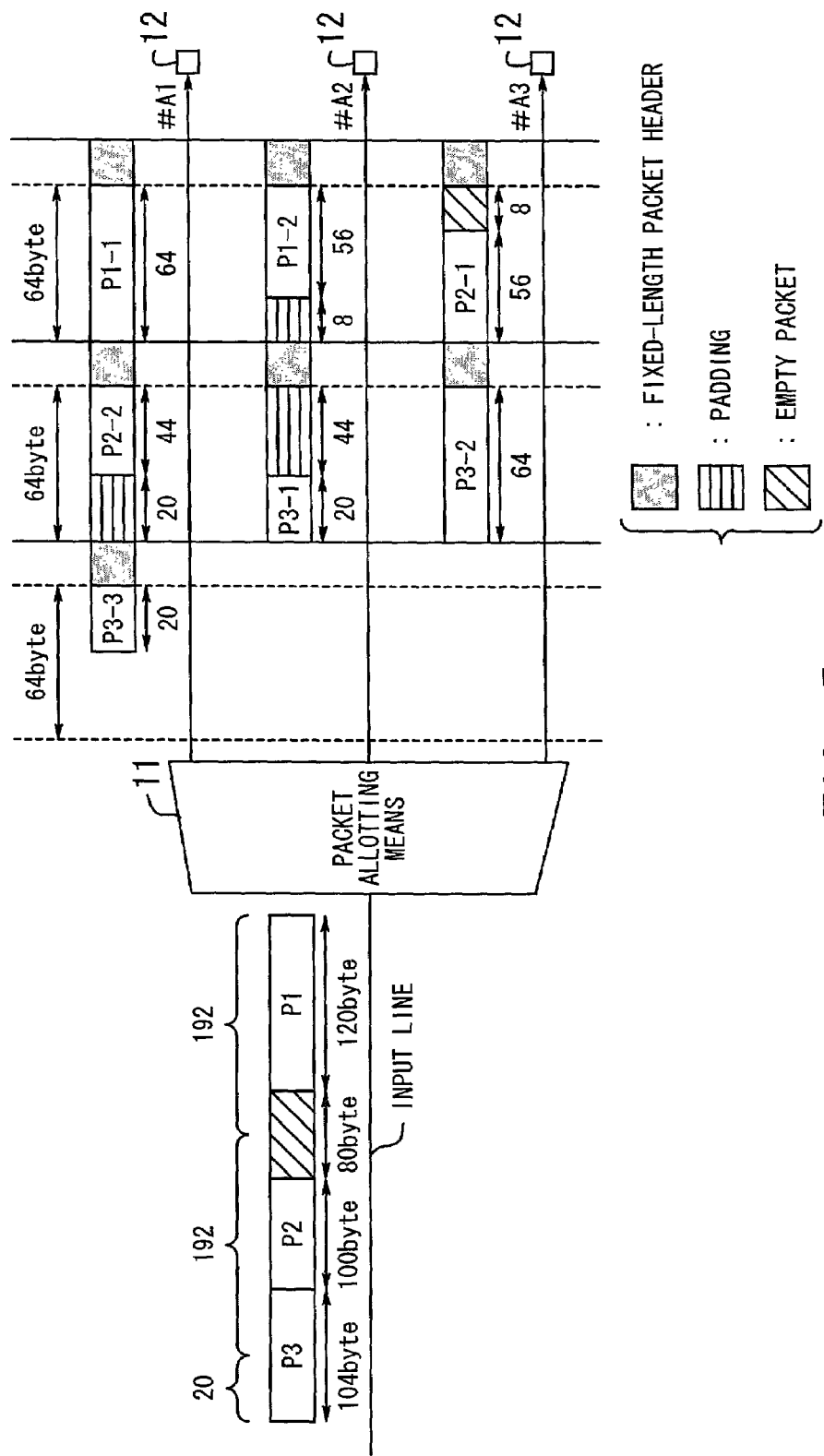
FIG. 5 is a view showing the operation of the packet allotting means.

FIG. 5 is a view showing the operation of the packet allotting means 11. In this example, when a variable-length packet arrives at the packet allotting means 11, the packet allotting means 11 divides it into fixed-length packets. When a packet does not arrive at the packet allotting means 11, the packet allotting means 11 stops an allotting process for a while (order-of-arrival allotting process). When a variable-length packet does not arrive in an order-of-arrival allotting process, the allotting process will be stopped. Except for this, allotting control is the same as that in FIG. 4.

In this example, the number of output routes is three and a divide time slot is 64 bytes. Therefore, a packet flow is first divided with 192 (=64×3) bytes as a unit. In addition, these 192 bytes are divided in three, that is to say, with 64 bytes as a unit and are allotted to the output routes in order of arrival.

Therefore, in this example, packet P1 of 120 bytes and an empty packet of 72 bytes (a total of 192 bytes) are divided in three, that is to say, with 64 bytes as a unit. Packet P1-1 of 64 bytes is allotted to output routes #A1. Packet P1-2 of 56 bytes and padding of 8 bytes are allotted to output routes #A2. An allotting process on the remaining 64 bytes will be stopped.

Moreover, with an empty packet of 8 bytes, packet P2 of 100 bytes, and packet P3 of 84 bytes (a total of 192 bytes), an empty packet of 8 bytes and packet P2-1 of 56 bytes, packet P2-2 of 44 bytes and padding of 20 bytes, padding of 44 bytes and packet P3-1 of 20 bytes, and packet P3-2 of 64 bytes are allotted to output routes #A3, #A1, #A2, and #A3 respectively. Packet P3-3 of the remaining 20 bytes is allotted to output route #A1.

As described above, the packet allotting means 11 performs a time division allotting process or order-of-arrival allotting process. In a time division allotting process, whether a packet which arrived is valid or invalid, allotting is performed on it in a constant cycle. As a result, the configuration of hardware can be simplified. However, if there is any relation between an allotting cycle and a pattern according which packets arrive, a batch of packets will be transferred to one output route. This needs larger buffers behind the packet allotting means 11.

In an order-of-arrival allotting process, when a variable-length packet does not arrive, an allotting process will be stopped. This will equalize the number of packets allotted to each output route. Therefore, loads on buffers can be equalized and the size of buffers needed can be reduced.

Figure 6:
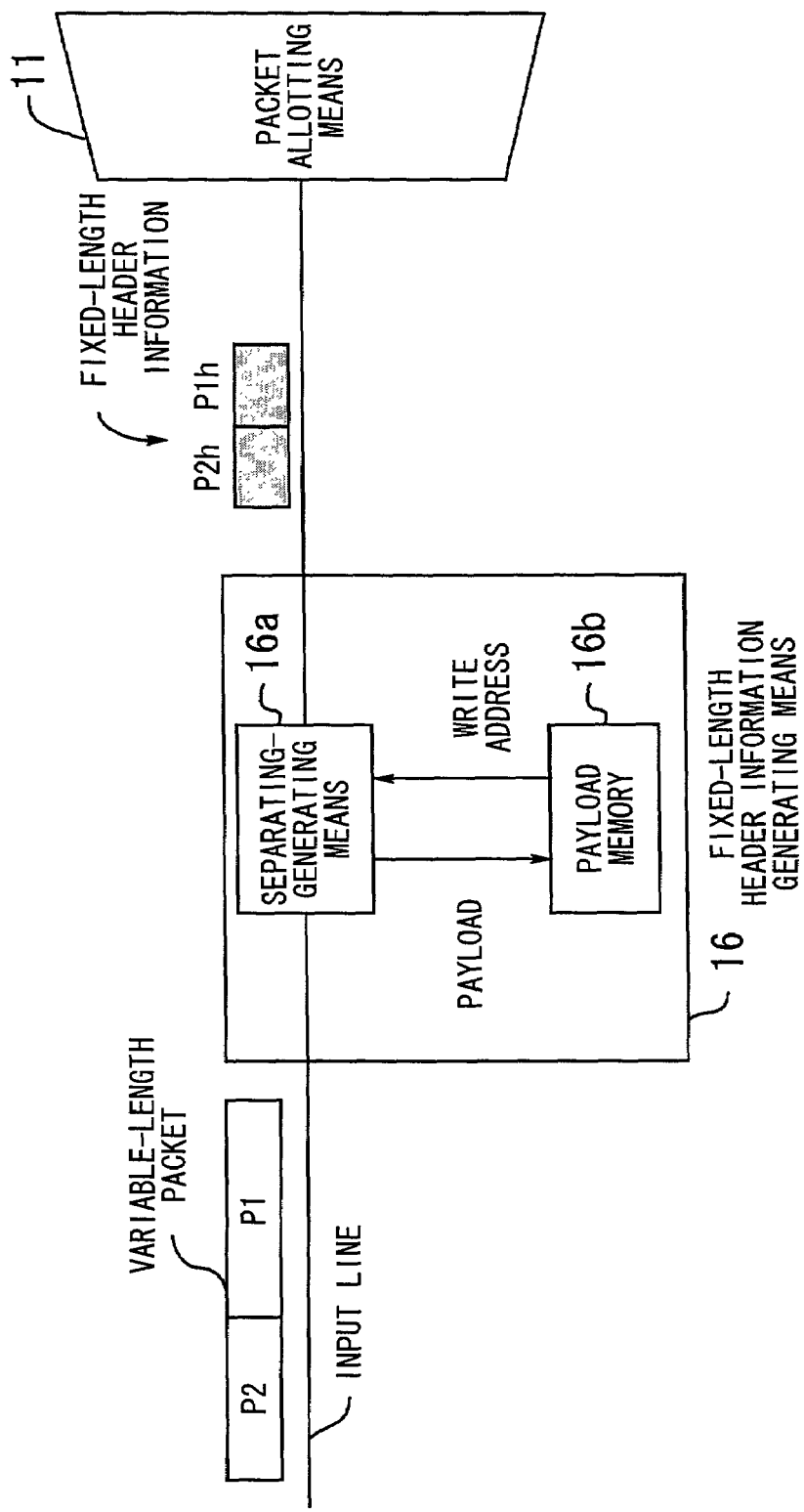
FIG. 6 is a view showing the structure and operation of fixed-length header information generating means.

Fixed-length header information generating means according to the present invention will now be described. FIG. 6 is a view showing the structure and operation of fixed-length header information generating means. In FIG. 6, fixed-length header information generating means 16 is located in front of the packet allotting means 11.

The fixed-length header information generating means 16 includes separating-generating means 16a and a payload memory 16b. The separating-generating means 16a separates header information and a payload included in a variable-length packet which arrived. The separated payload is sent to the payload memory 16b.

The payload memory 16b stores the payload sent and sends the separating-generating means 16a a write address where the payload was stored. The separating-generating means 16a extracts necessary information from the header information it separated from the payload, and newly generates the header information for fixed-length packets described in FIG. 3.

Moreover, the separating-generating means 16a fills in the Address field in row #16 of this fixed-length header information shown in FIG. 3 with the write address where the payload was written. The packet allotting means 11 allots the fixed-length header information sent from the fixed-length header information generating means 16 to a plurality of parallel lines and outputs it.

In FIG. 6, variable-length packets P1 and P2 correspond to fixed-length header information P1$h$ and P2$h$ respectively.

Figure 7:
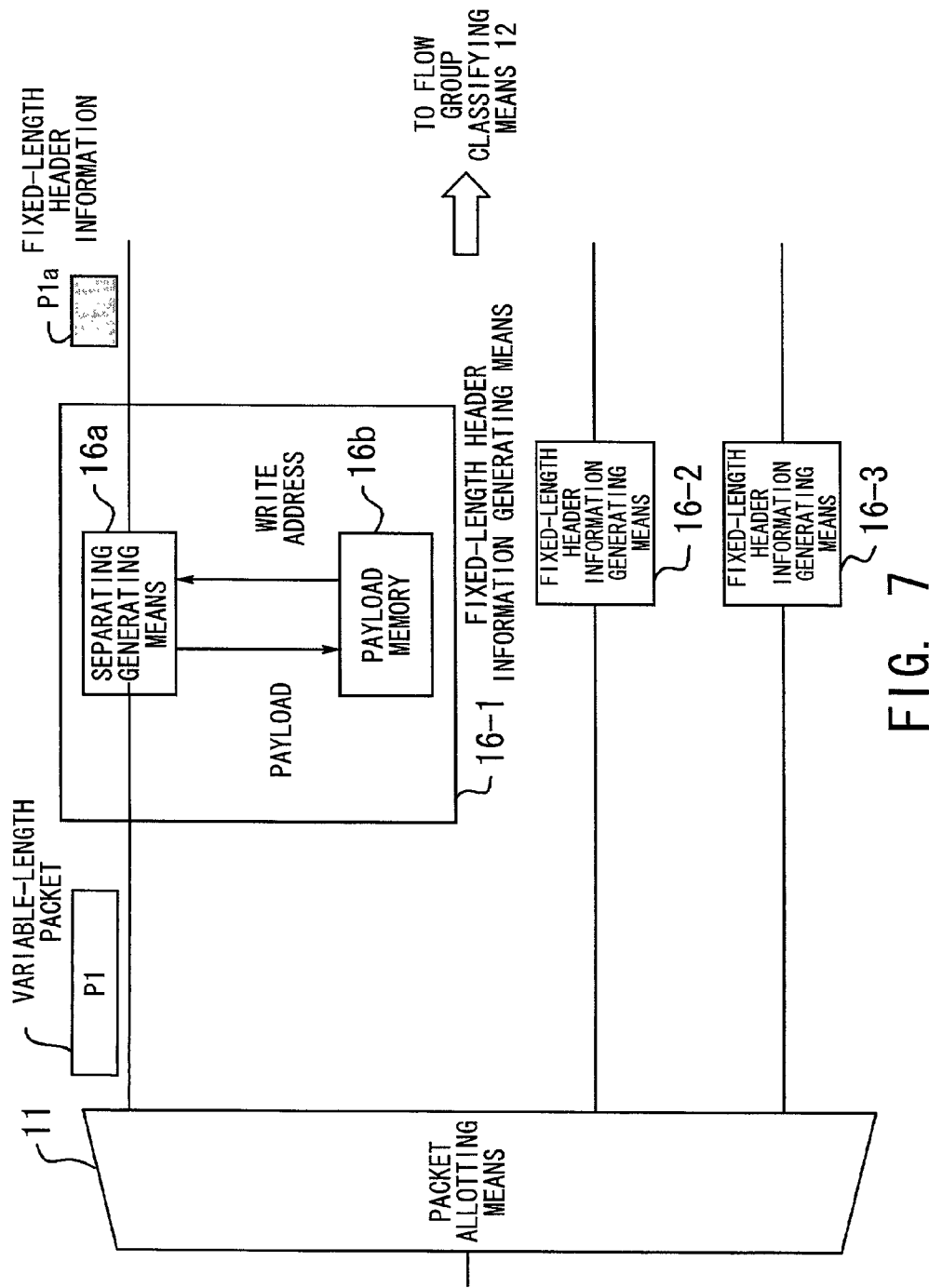
FIG. 7 is a view showing the structure and operation of the fixed-length header information generating means.

FIG. 7 is a view showing the structure and operation of the fixed-length header information generating means. In FIG. 7, the fixed-length header information generating means 16 is located behind the packet allotting means 11. In this example, fixed-length header information generating means 16-1, 16-2, and 16-3 are located on three parallel lines respectively. Fixed-length header information for packets allotted by the packet allotting means 11 is generated on each parallel line. The fixed-length header information generated is sent to the flow group classifying means 12. In this case, the packet allotting means 11 allots variable-length packets which arrive to each parallel line in order of arrival.

As described above, the fixed-length header information generating means 16 which separates header information and a payload included in a variable-length packet and generates fixed-length header information on the basis of the header information can be located. This fixed-length header information will be sent to a processing section located behind the fixed-length header information generating means 16.

In the cases of FIGS. 6 and 7, processes in sections located in front of a switching section in a packet communication device according to the present invention (described in FIG. 15 and what follows) will be performed by the use of fixed-length header information. When a switching process is performed, the payload, which was separated previously from the header information, and the fixed-length header information will be combined into a fixed-length packet and be input to the switching section.

Now, operation performed for flow allotment scheduling including classifying packets into flow groups, giving packets sequence numbers, buffering packets, and allotting packets according to flow groups will be described.

Figure 8:
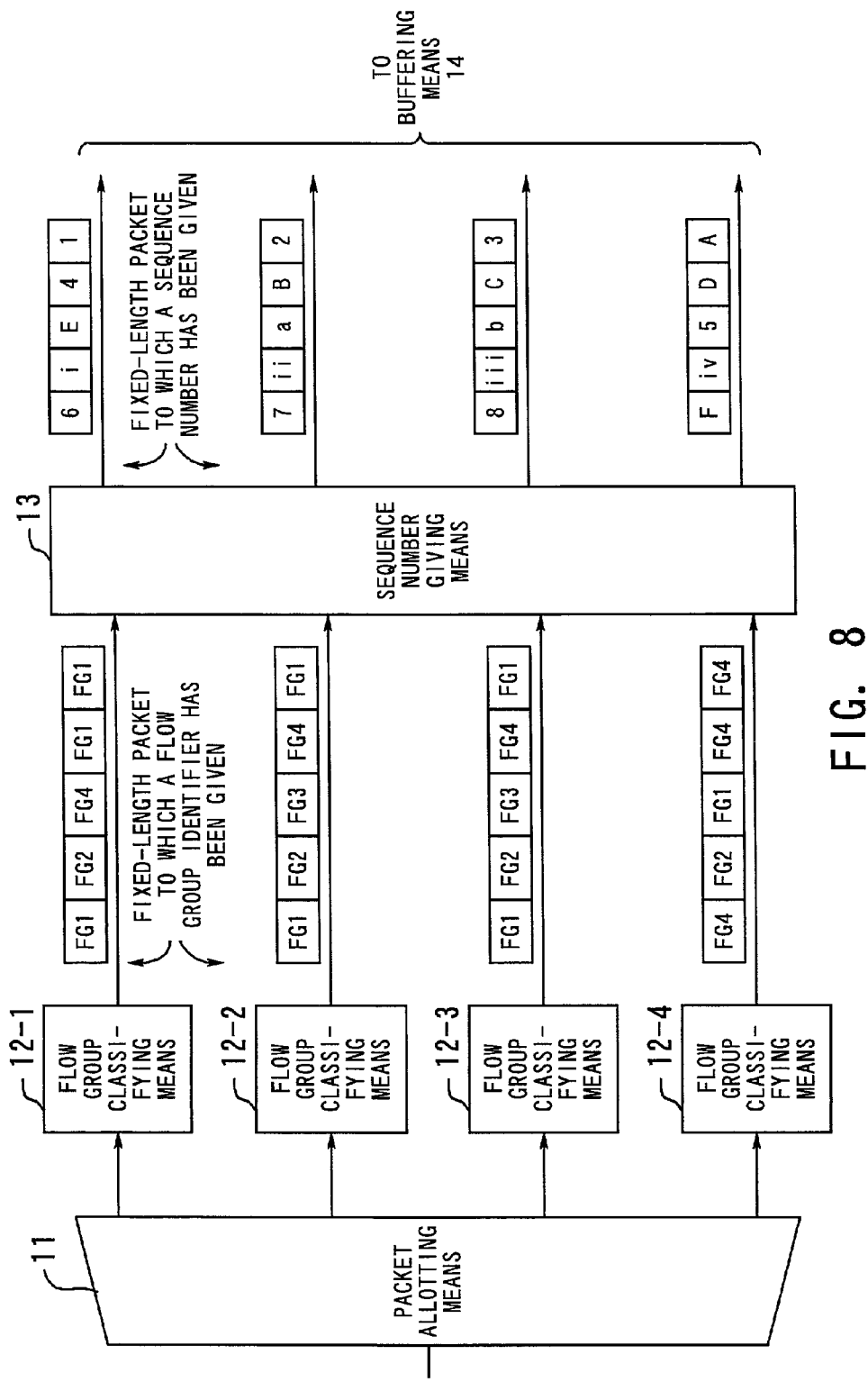
FIG. 8 is a view showing the operation of flow group classifying means and sequence number giving means.

FIG. 8 is a view showing the operation of the flow group classifying means 12 and sequence number giving means 13. The packet allotting means 11 converts a variable-length packet into fixed-length packets and allots them to four parallel lines.

The flow group classifying means 12-1 through 12-4 are located on the four parallel lines respectively and classify the fixed-length packets (or fixed-length header information) they received into flow groups (four flow groups, in this example).

For example, it is assumed that flow group identifiers are FG1 through FG4. The flow group classifying means 12-1 classifies fixed-length packets it received into four flow groups, enters one of flow group identifiers FG1 through FG4 in each of the fixed-length packets it classified, and outputs them in a way, for example, shown in FIG. 8. These flow group identifiers are entered in the Flow Group Identifier field in row #0 shown in FIG. 3.

The sequence number giving means 13 gives fixed-length packets in which one of the flow group identifiers is entered sequence numbers unique to each flow group. These sequence numbers are entered in the SN field in row #2 shown in FIG. 3.

To simplify descriptions, it is assumed that numerals, Roman numerals, lowercase alphabets, and uppercase alphabets are given to fixed-length packets which belong to flow groups FG1 through FG4, respectively, as sequence numbers.

The sequence number giving means 13 therefore gives sequence numbers in a way shown in FIG. 8. Fixed-length packets to which sequence numbers have been given are sent to the buffering means 14.

Figure 9:
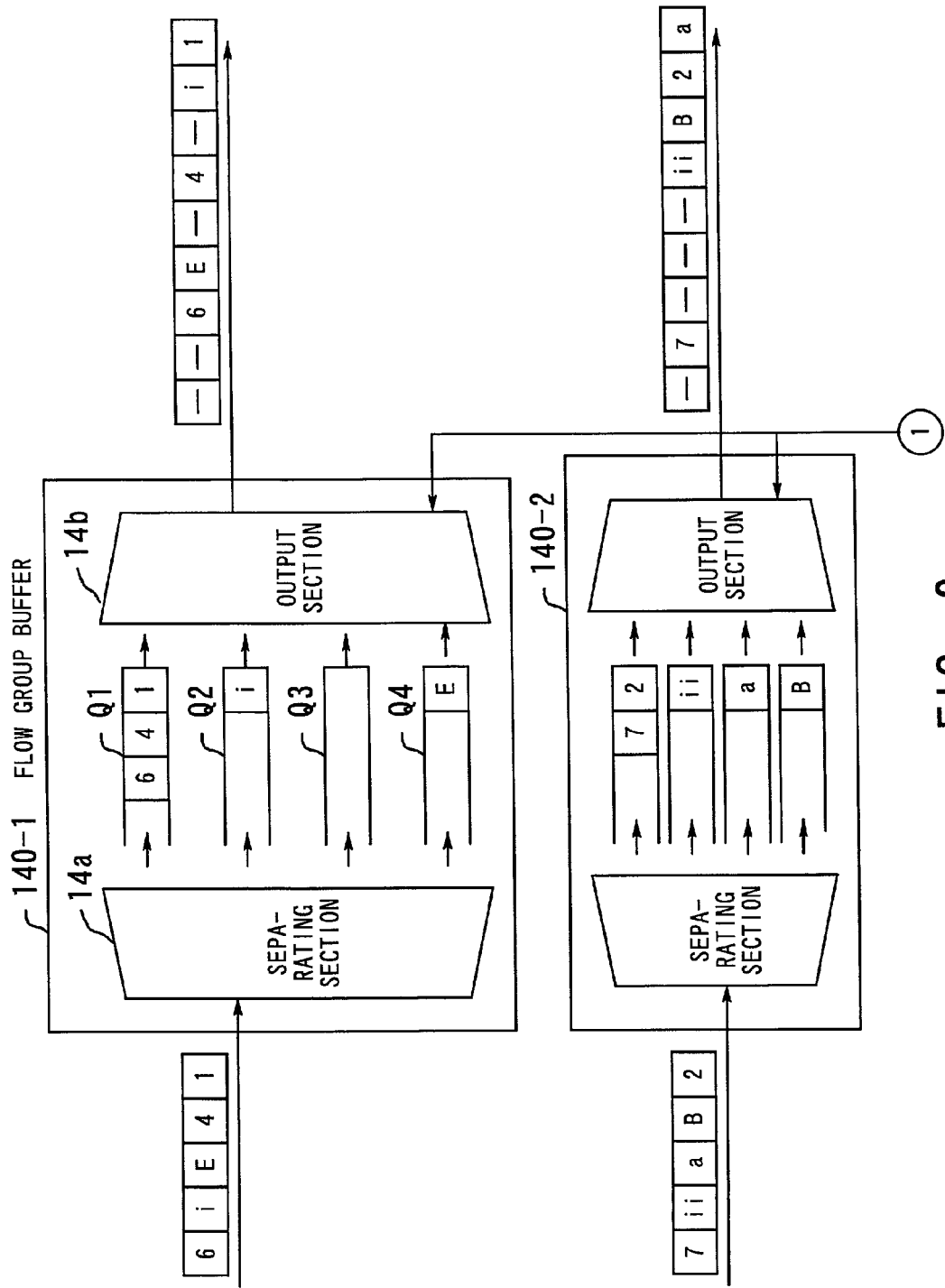
FIG. 9 is a view showing the structure and operation of buffering means.
Figure 10:
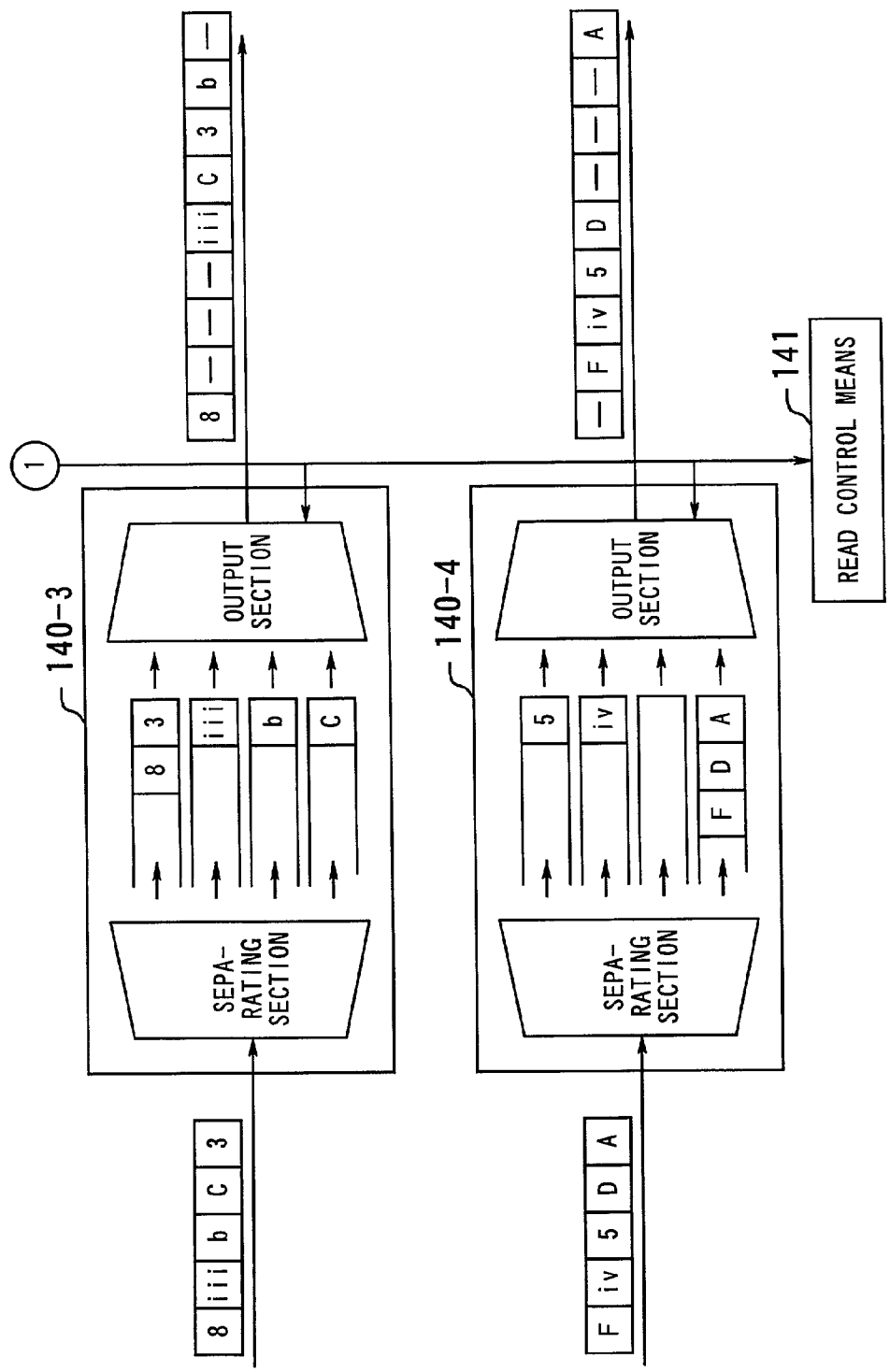
FIG. 10 is a view showing the structure and operation of the buffering means.

The buffering means 14 will now be described. FIGS. 9 and 10 are views showing the structure and operation of the buffering means 14. FIG. 11 is a view showing the read operation of read control means. The buffering means 14 includes flow group buffers 140-1 through 140-4 (collectively referred to as a "flow group buffer 140") and read control means 141. In this example, there are four parallel lines and the flow group buffers 140-1 through 140-4 are located on these parallel lines respectively. The flow group buffer 140 includes a separating section 14$a$, queues Q1 through Q4, and an output section 14$b$.

In the flow group buffer 140-1, the separating section 14$a$ separates fixed-length packets, to which sequence numbers have been given, according to flow groups FG1 through FG4 and outputs them to queues Q1 through Q4. Queues Q1 through Q4 correspond to flow groups FG1 through FG4 respectively. Fixed-length packets are queued according to flow groups and are sent to the output section 14$b$. The output section 14$b$ outputs the fixed-length packets under the read control of the read control means 141.

The read control means 141 includes read counters for reading out fixed-length packets according to flow groups. A procedure for reading is as follows. First, instructions to read fixed-length packets with the sequence numbers of 1, i, a, and A are sent to the output section 14$b$ in the flow group buffers 140-1 through 140-4 at count #1 (see FIG. 11).

In this case, the flow group buffer 140-1 which stores the fixed-length packets with the sequence numbers of 1 and i outputs the fixed-length packet with the sequence number of 1. If there are a plurality of fixed-length packets to be output (the fixed-length packets with the sequence numbers of 1 and i, in this example), the order in which they are output is determined by the use of, for example, a round robin.

Similarly, the flow group buffer 140-2 outputs the fixed-length packet with the sequence number of a. The flow group buffer 140-3 does not store a fixed-length packet the sequence number of which is specified at count #1, so its output is empty. The flow group buffer 140-4 outputs the fixed-length packet with the sequence number of A.

Sequence numbers 1, a, and A were read out from the read counters in the read control means 141 at count #1. These sequence numbers therefore will be incremented to 2, b, and B, respectively, at count #2. Sequence number i specified at count #1 was not read out, so it will not be incremented, that is to say, it will remain i at count #2.

Next, the read control means 141 send instructions to read fixed-length packets with the sequence numbers of 2, i, b, and B to the output section 14$b$ in the flow group buffers 140-1 through 140-4 at count #2.

The flow group buffer 140-1 outputs the fixed-length packet with the sequence number of i. The flow group buffer 140-2 outputs the fixed-length packet with the sequence number of 2. The flow group buffer 140-3 outputs the fixed-length packet with the sequence number of b. The flow group buffer 140-4 does not store a fixed-length packet the sequence number of which is specified at count #2, so its output is empty.

Sequence numbers 2, i, and b were read out from the read counters in the read control means 141 at count #2. These sequence numbers therefore will be incremented to 3, ii, and c, respectively, at count #3. Sequence number B specified at count #2 was not read out, so it will not be incremented, that is to say, it will remain B at count #3. The same procedure will be repeated to read out fixed-length packets from the flow group buffer 140.

As described above, the buffering means 14 controls the storing and reading of fixed-length packets to which sequence numbers corresponding to flow groups are added. This enables to prevent the order of packets in a flow from being reversed, resulting in efficient sequence control.

Figure 12:
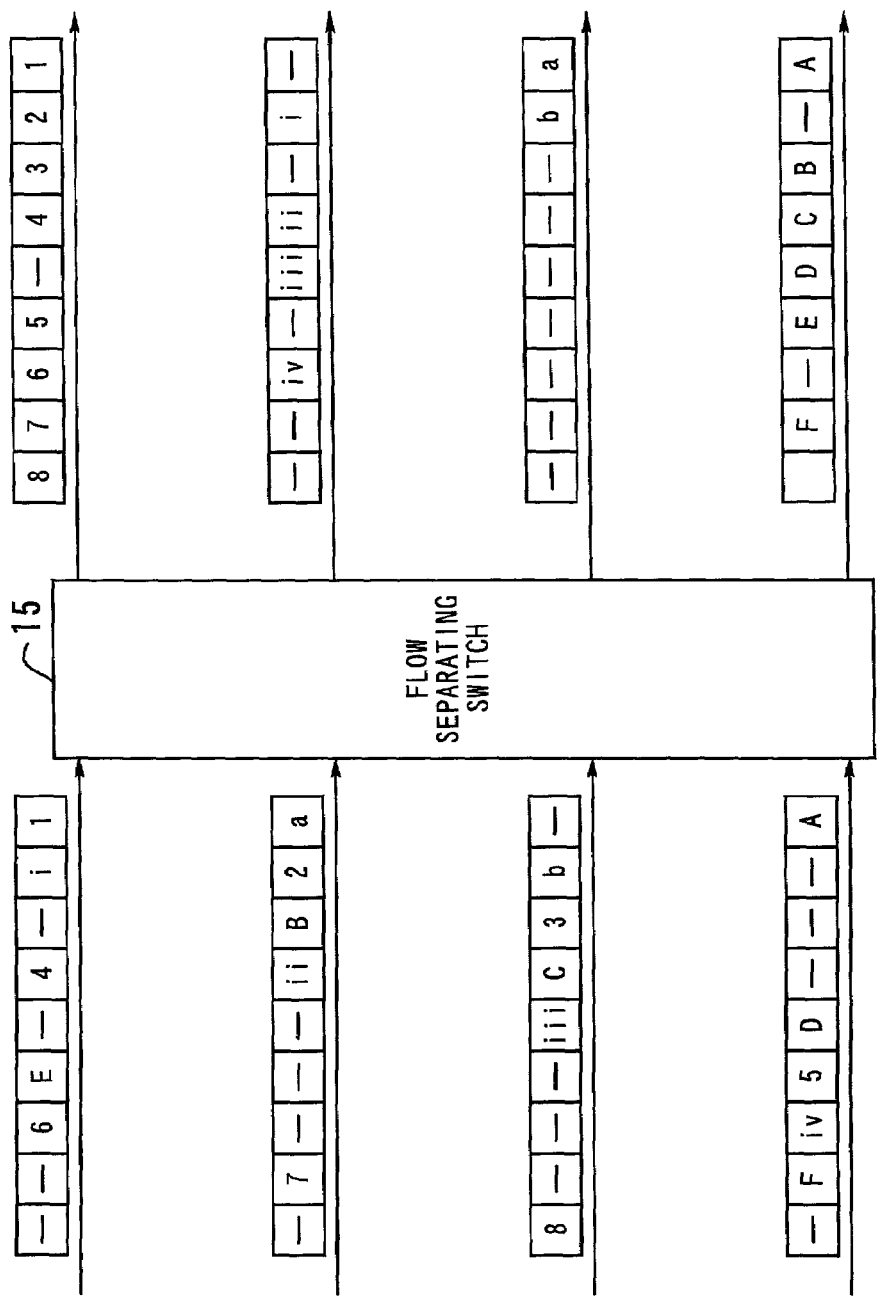
FIG. 12 is a view showing the operation of a flow separating switch.

The flow separating switch 15 will now be described. FIG. 12 is a view showing the operation of the flow separating switch 15. The flow separating switch 15 allots fixed-length packets sent from the buffering means 14 according to flow groups and outputs them. In FIG. 12, fixed-length packets of flow groups FG1 through FG4 are output in that order from the top. In the case of outputting fixed-length packets, spaces can be eliminated by buffering.

Now, another embodiment of the flow allotment scheduling will be described. In a first modification described below, sequence numbers are given independently of flow groups to perform flow allotment scheduling.

Figure 13:
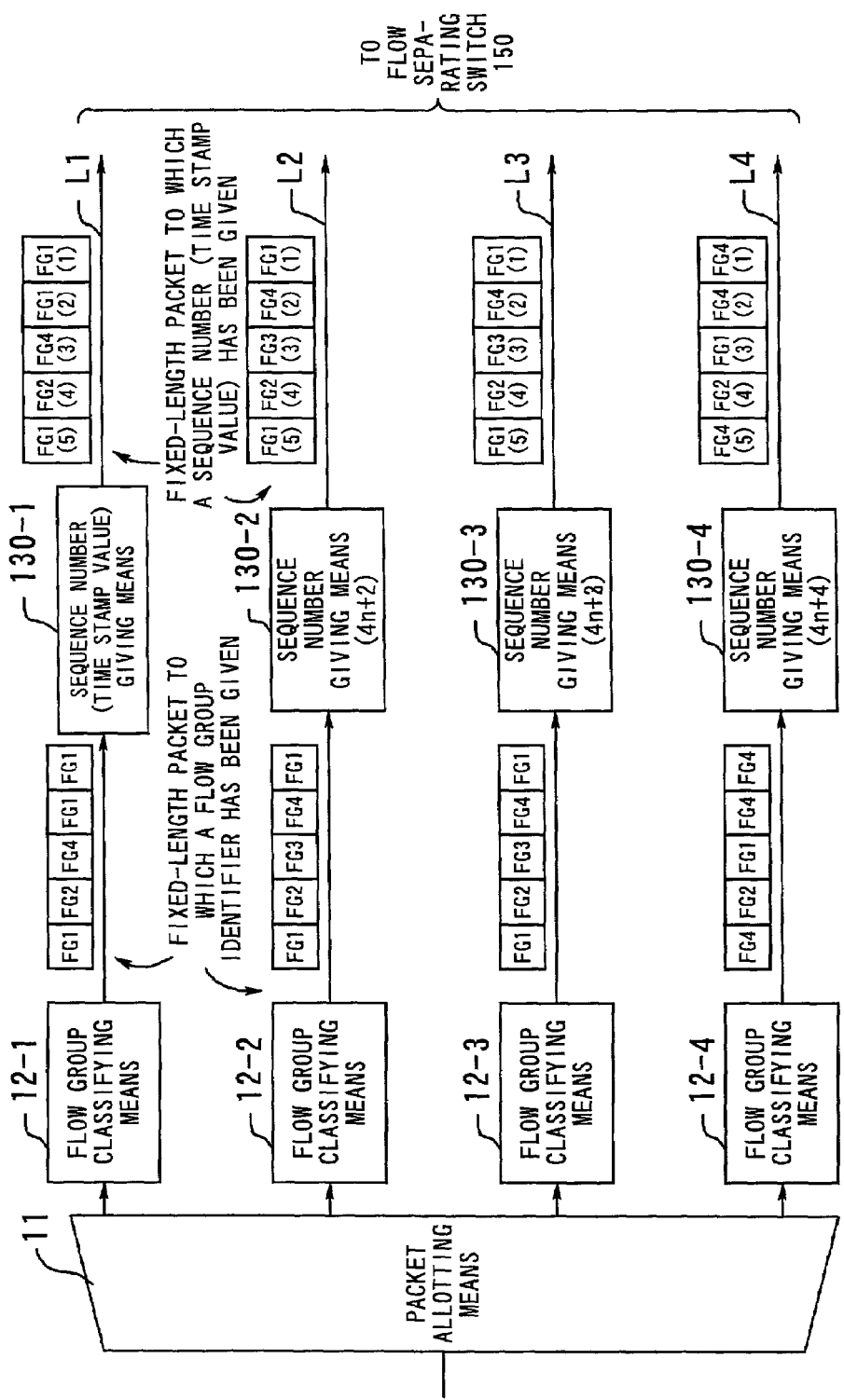
FIG. 13 is a view showing the operation of sequence number giving means.

FIG. 13 is a view showing the operation of sequence number giving means. Operation performed in sections located in front of sequence number giving means 130-1 through 130-4 (collectively referred to as "sequence number giving means 130") in FIG. 13 is the same as that in FIG. 8. When the sequence number giving means 130 receives fixed-length packets to which flow group identifiers have been given, it gives sequence numbers (referred to as "time stamp values," in this case) to the fixed-length packets in synchronization with the flow group classifying means 12. These time stamp values will be given every time slot independently of the flow groups. Numerals shown in parentheses in FIG. 13 are time stamp values. Fixed-length packets to which time stamp values have been given are sent to a flow separating switch 150 via parallel lines L1 through L4.

Figure 14:
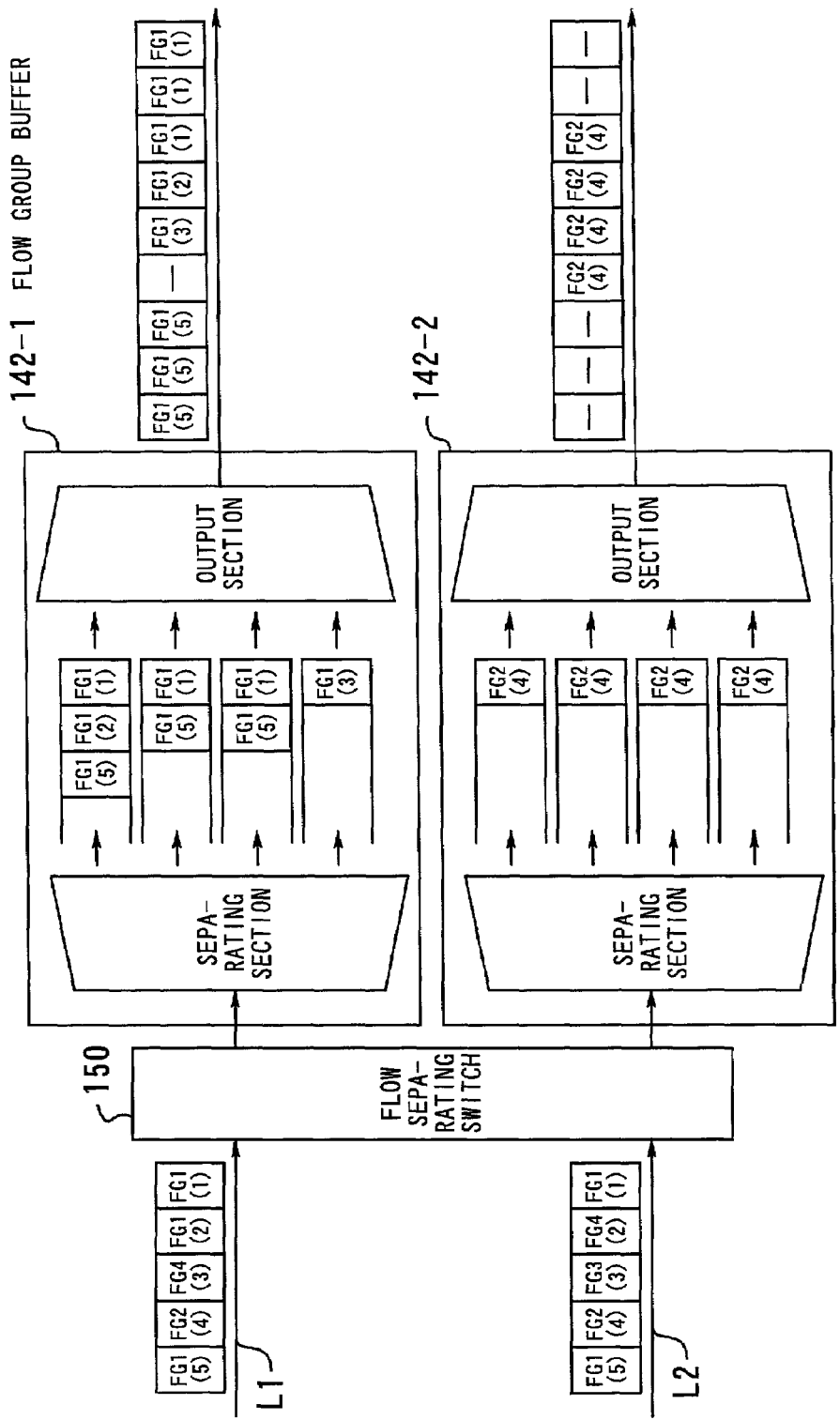
FIG. 14 is a view showing the operation of a flow separating switch and buffering means.
Figure 15:
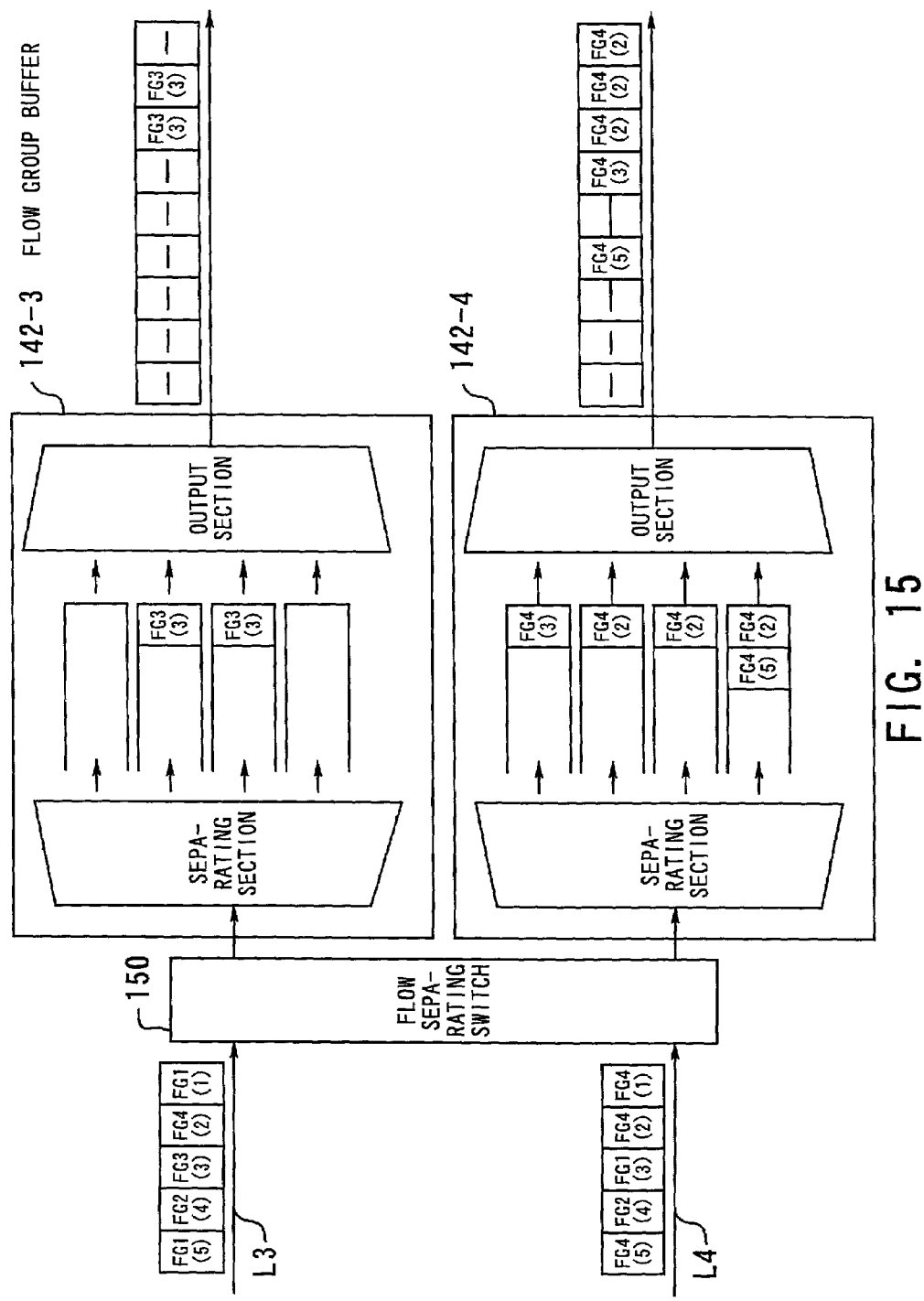
FIG. 15 is a view showing the operation of a flow separating switch and buffering means.

FIGS. 14 and 15 are views showing the operation of the flow separating switch and buffering means. The flow separating switch 150 is a switch of an output buffer type. The flow separating switch 150 receives packets output from the sequence number giving means 130-1 through 130-4 and switches them according to flow groups.

The buffering means includes flow group buffers 142-1 through 142-4 (collectively referred to as a "flow group buffer 142"). Queues Q1 through Q4 in the flow group buffer 142 queue packets of the same flow group sent via parallel lines L1 through L4 respectively.

For example, queue Q1 in the flow group buffer 142-1 stores packets of flow group FG1 sent via parallel line L1; queue Q2 stores packets of flow group FG1 sent via parallel line L2; queue Q3 stores packets of flow group FG1 sent via parallel line L3; queue Q4 stores packets of flow group FG1 sent via parallel line L4. Similarly, queues Q1 through Q4 in the flow group buffer 142-2 store packets of flow group FG2 sent via parallel lines L1 through L4 respectively; queues Q1 through Q4 in the flow group buffer 142-3 store packets of flow group FG3 sent via parallel lines L1 through L4 respectively; queues Q1 through Q4 in the flow group buffer 142-4 store packets of flow group FG4 sent via parallel lines L1 through L4 respectively.

Moreover, the flow group buffer 142 reads out packets in numerical order in reference to their time stamp values by the use of a round robin and outputs them according to the flow groups.

This structure of the first modification enables efficient flow allotment scheduling without reversing the order of packets. In addition, an increase in internal processing speed will prevent degradation in throughput caused by control over reading from flow group buffers.

Figure 16:
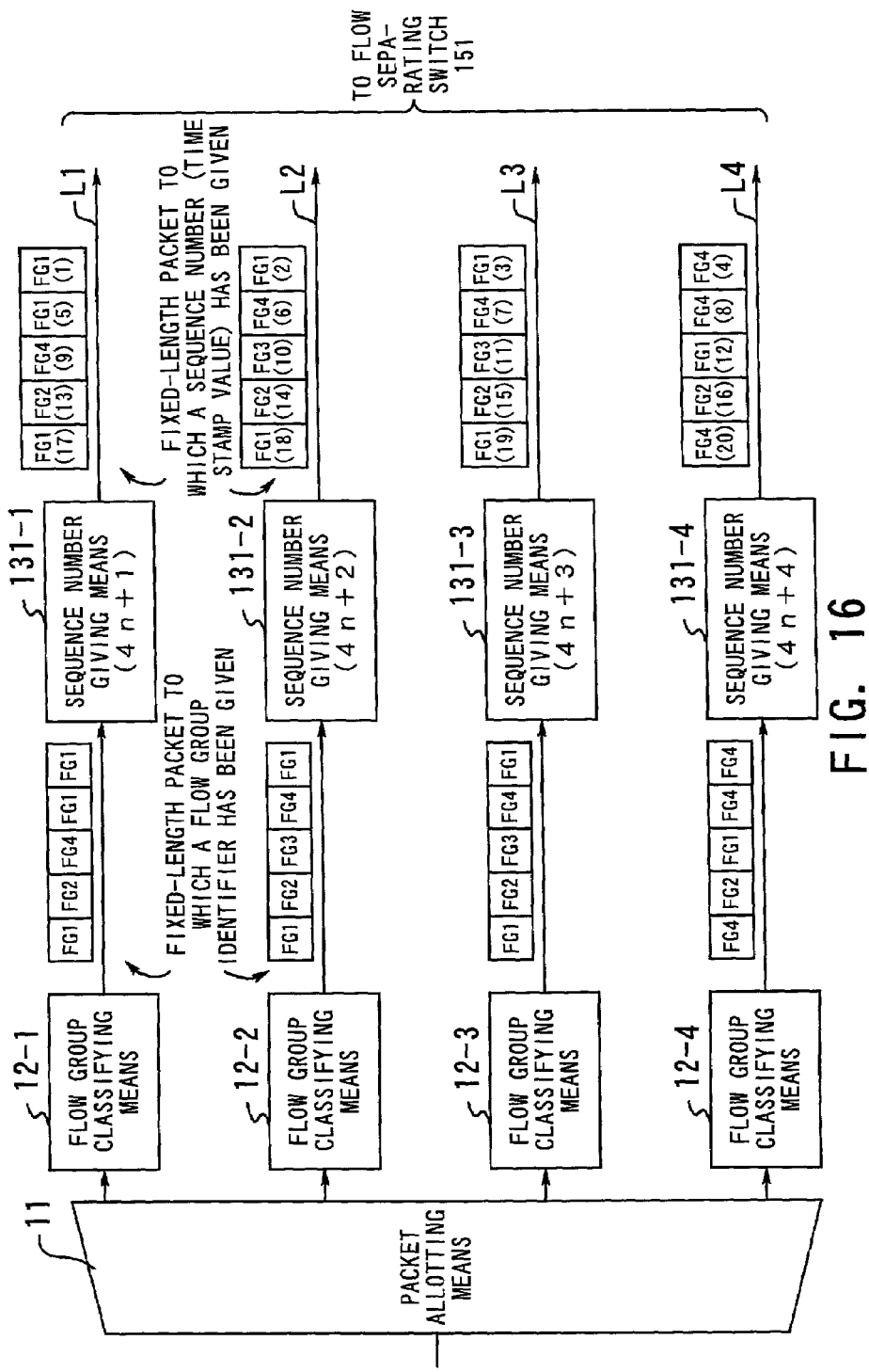
FIG. 16 is a view showing the operation of sequence number giving means.

A second modification of the flow allotment scheduling will now be described. FIG. 16 is a view showing the operation of sequence number giving means. Operation performed in sections located in front of sequence number giving means 131-1 through 131-4 (collectively referred to as "sequence number giving means 131") in FIG. 16 is the same as that in FIG. 8. When the sequence number giving means 131 receives fixed-length packets to which flow group identifiers have been given, it gives time stamp values to the fixed-length packets in synchronization with the flow group classifying means 12. These time stamp values will be given every time slot independently of the flow groups. In this case, the sequence number giving means 131-1 through 131-4 give the time stamp values of 4n+1, 4n+2, 4n+3, and 4n+4 (n=0, 1, 2, . . . ) respectively. Numerals shown in parentheses in FIG. 16 are time stamp values. Fixed-length packets to which time stamp values have been given are sent to a flow separating switch 151 via parallel lines L1 through L4.

Figure 17:
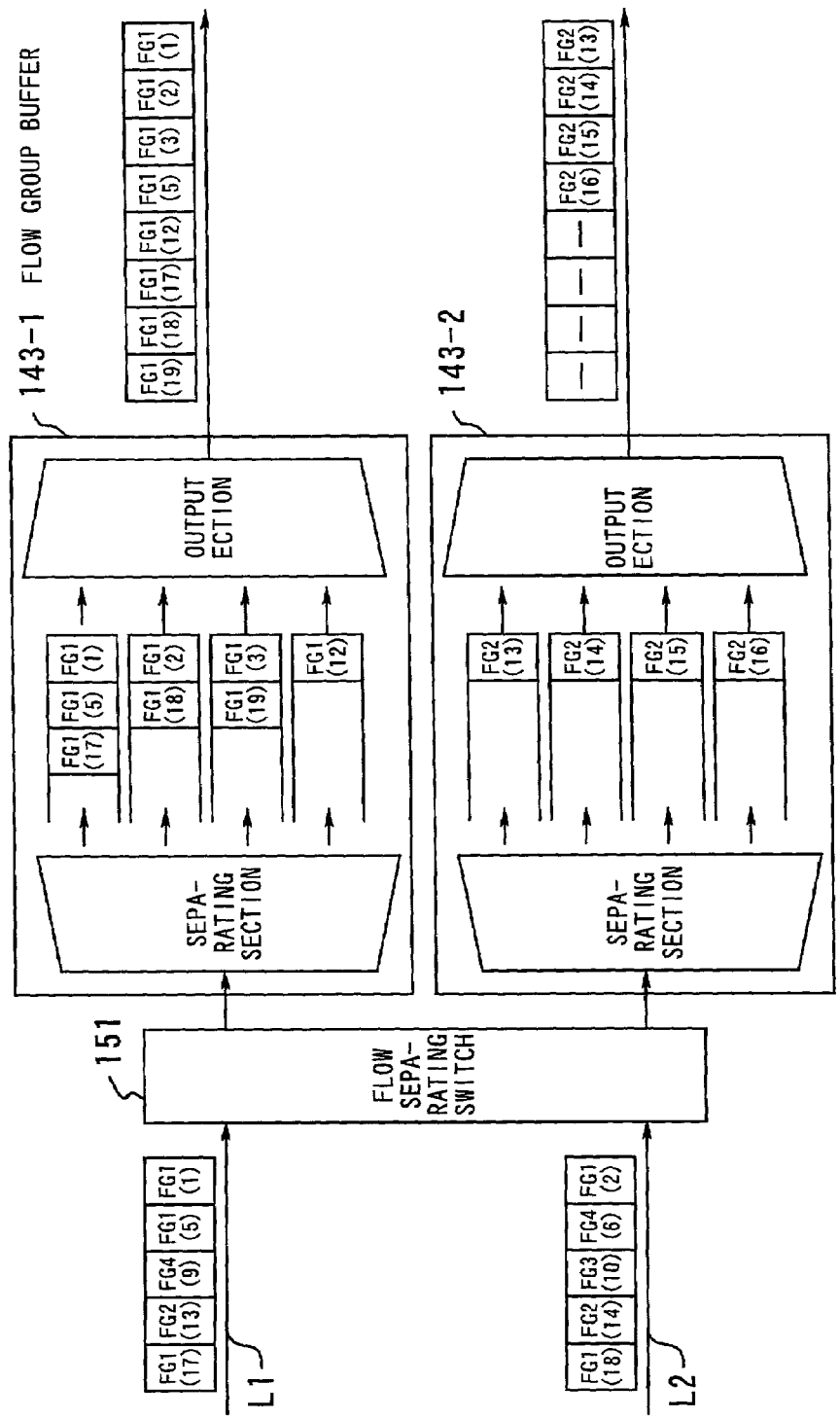
FIG. 17 is a view showing the operation of a flow separating switch and buffering means.
Figure 18:
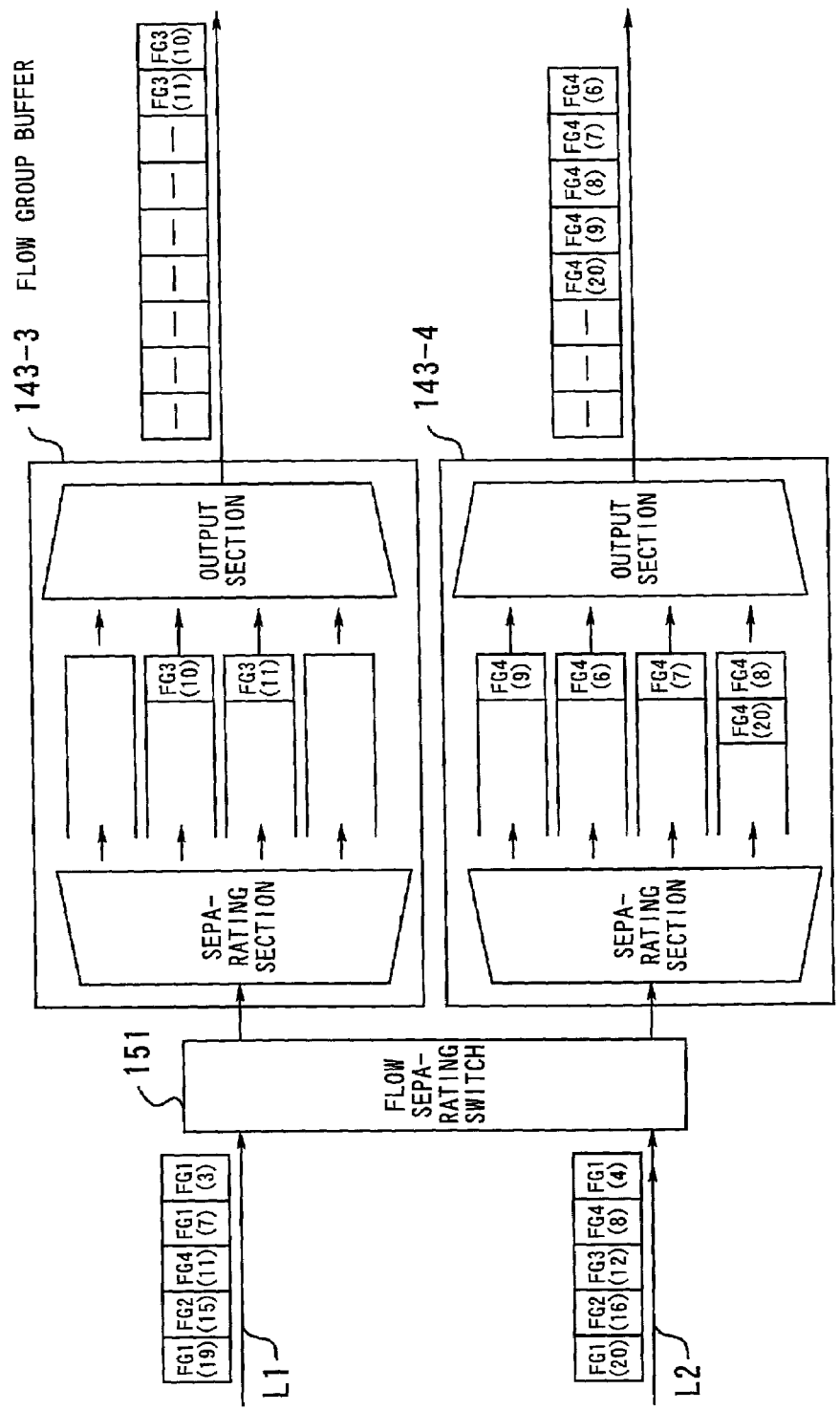
FIG. 18 is a view showing the operation of a flow separating switch and buffering means.

FIGS. 17 and 18 are views showing the operation of the flow separating switch and buffering means. The flow separating switch 151 is a switch of an output buffer type. The flow separating switch 151 receives packets output from the sequence number giving means 131-1 through 131-4 and switches them according to flow groups.

The buffering means includes flow group buffers 143-1 through 143-4 (collectively referred to as a "flow group buffer 143"). Queues Q1 through Q4 in the flow group buffer 143 queue packets of the same flow group sent via parallel lines L1 through L4 respectively. Moreover, the flow group buffer 143 reads out packets in ascending order in reference to their time stamp values and outputs them according to the flow groups.

This structure of the second modification enables efficient flow allotment scheduling without reversing the order of packets. Furthermore, unlike the first modification, the same time stamp values do not exist. This makes it easy to control reading from flow group buffers and makes it unnecessary to improve internal processing speed.

Figure 19:
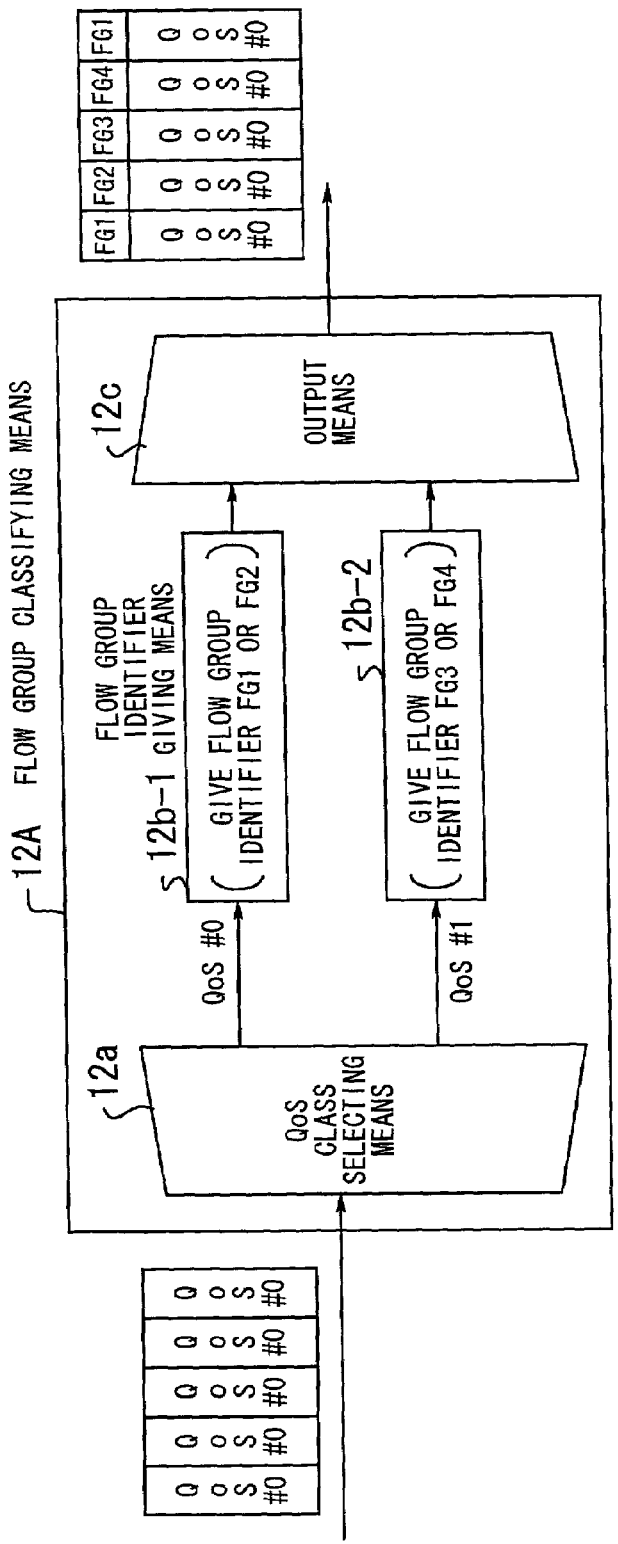
FIG. 19 is a view showing the structure of flow group classifying means to which QoS control is added.

Now, the flow group classifying means 12 and flow group buffer 140 with QoS taken into consideration will be described. FIG. 19 is a view showing the structure of flow group classifying means to which QoS control is added.

Flow group classifying means 12A includes QoS class selecting means 12a, flow group identifier giving means 12b-1 and 12b-2, and output means 12c. The QoS class selecting means 12a selects fixed-length packets it received according to QoS classes and outputs them. The flow group identifier giving means 12b-1 and 12b-2 give flow group identifiers to packets according to the QoS classes. The output means 12c outputs fixed-length packets to which flow group identifiers have been given.

In this example, the flow group identifier giving means 12b-1 gives flow group identifier FG1 or FG2 to fixed-length packets of QoS #0 and the flow group identifier giving means 12b-2 gives flow group identifier FG3 or FG4 to fixed-length packets of QoS #1. As stated above, if fixed-length packets are classified into flow groups corresponding to QoS classes, one QoS class will not interfere with another and quality can be assured.

Figure 20:
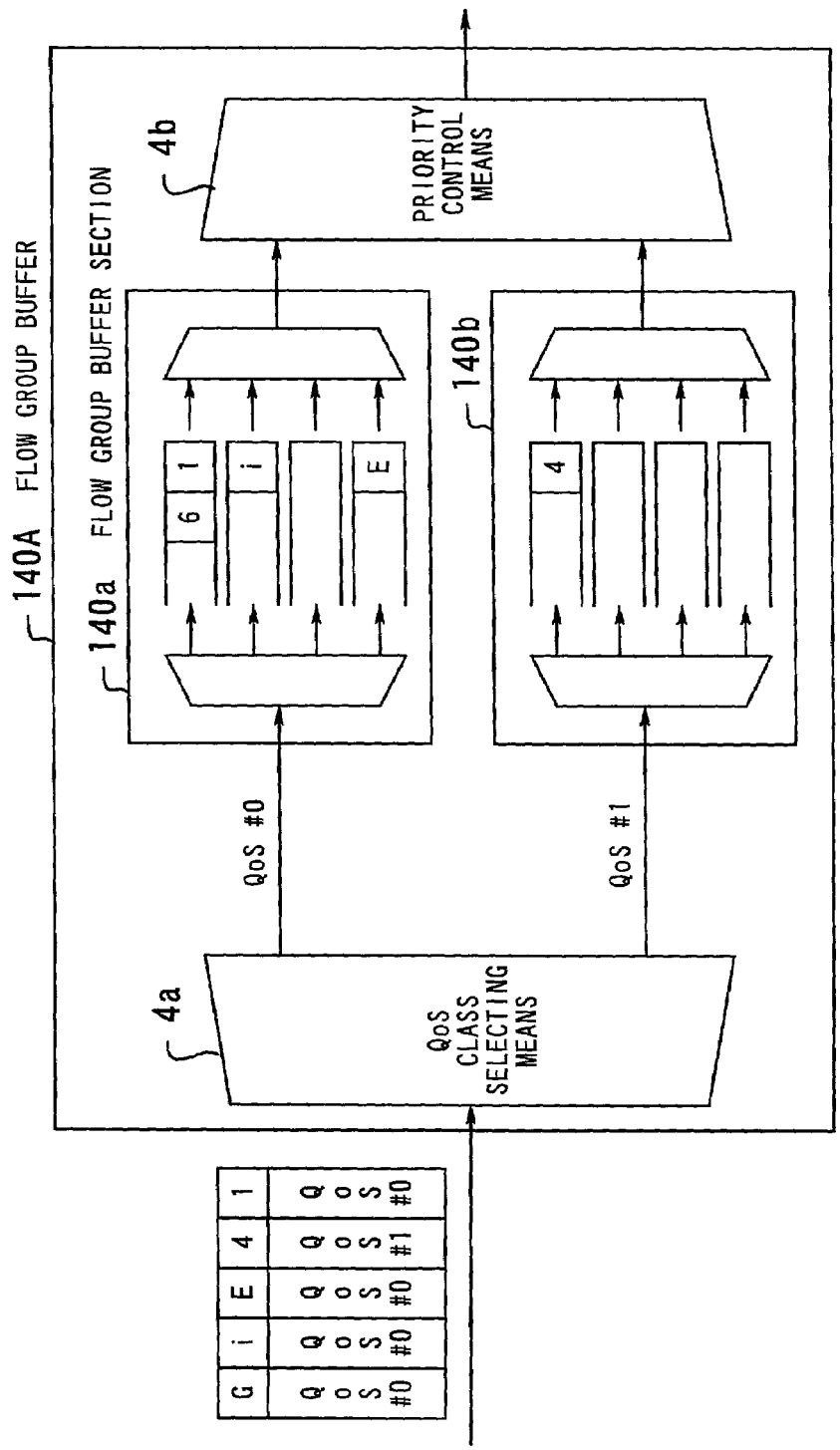
FIG. 20 is a view showing the structure of a flow group buffer to which QoS control is added.

FIG. 20 is a view showing the structure of a flow group buffer to which QoS control is added. A flow group buffer 140A includes QoS class selecting means 4a, flow group buffer sections 140a and 140b, and priority control means 4b.

The QoS class selecting means 4a selects fixed-length packets it received according to QoS classes and outputs them. The structure of the flow group buffer sections 140a and 140b is the same as that of the flow group buffers described in FIGS. 9 and 10. That is to say, the flow group buffer sections 140a and 140b buffer fixed-length packets allotted to them according to the QoS classes. These fixed-length packets are read out by the read control means 141. The priority control means 4b outputs the fixed-length packets the read control means 141 read out in the order of descending priorities. (If QoS #0 and #1 correspond to band-guaranteed and best effort services respectively, fixed-length packets of QoS #0 will be output by priority.) By doing so, one QoS class will not interfere with another and quality can be assured.

Figure 21:
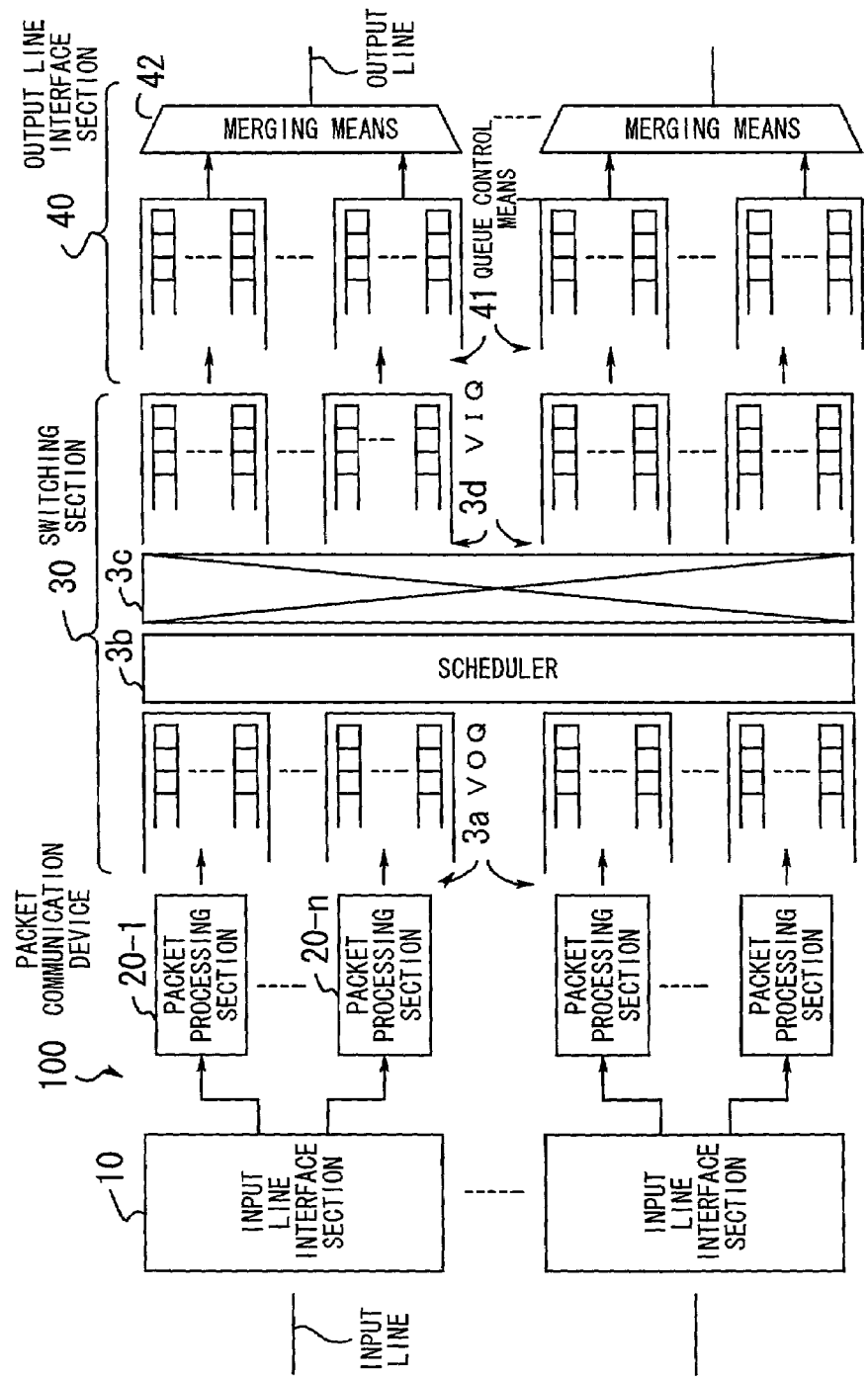
FIG. 21 is a view showing the structure of a packet communication device according to the present invention.

Now, a packet communication device according to the present invention to which the input line interface device 10 is applied will be described. FIG. 21 is a view showing the structure of a packet communication device according to the present invention.

A packet communication device 100 is a router unit for accommodating a plurality of input lines, performing a routing process in parallel at the hardware level, and outputting packets to a predetermined output line.

Each of the plurality of input lines is connected to an input line interface section 10 (which corresponds to the input line interface device 10 shown in FIG. 1). On the output side of the input line interface section 10, packet processing sections 20-1 through 20-n (collectively referred to as a "packet processing section 20") are located. "n" corresponds to the number of flow groups into which the input line interface section 10 classifies packets.

A switching section 30 including a virtual output queue (VOQ) 3a, a scheduler 3b, a crossbar switch 3c, and a virtual input queue (VIQ) 3d and an output line interface section 40 including queue control means 41 and merging (combining) means 42 are located behind the packet processing section 20.

The input line interface section 10 converts a variable-length packet input from the input line into fixed-length packets, classifies them into flow groups, and outputs them.

The packet processing section 20 performs packet processing most of which relates to Layer 3. For example, the packet processing section 20 exercises routing control for selecting an output line for input packets of the same flow group on the basis of their IP addresses or filtering control for accepting or discarding packets by referring to their IP addresses or port numbers.

The VOQ 3a in the switching section 30 queues the packets which were processed by the packet processing section 20. The scheduler 3b reads out the packets from the VOQ 3a and sends them to the crossbar switch 3c. In this case, the scheduler 3b performs a scheduling process to arrange the order in which the packets are read out. The crossbar switch 3c performs switching on the packets, which will be output from output lines. The VIQ 3d stores the packets on which a switching process was performed, and sends them to the output line interface section 40.

The queue control means 41 in the output line interface section 40 queues the packets to maintain their quality in flow groups. The merging means 42 merges the packets and outputs them to the output lines, with their quality maintained.

In the switching section 30, a switch of an input buffer type which performs switching by the fixed-length packet is used. Therefore, after switching is performed, fixed-length packets are reassembled into a variable-length packet by the VIQ 3d and are written to the queue control means 41. To simplify a process in the queue control means 41, fixed-length packets are reassembled into a variable-length packet consisting of a plurality of fixed-length packets, not into a complete variable-length packet. Just before the variable-length packet being output from an output line, the overhead portions of the plurality of fixed-length packets are removed to change the variable-length packet into the original complete one.

The operation of the queue control means 41 will now be described. It is assumed that input lines with a capacity of 40 Gb/s are accommodated and that packets which were divided in blocks of 10 Gb/s and switched are output again from output lines with a capacity of 40 Gb/s.

After packets are allotted to four lines with a capacity of 10 Gb/s by the input line interface section 10, they are processed and switched. But in reality each line speed shifts.

The VIQ 3d exercises control over reading out by the use of, for example, a round robin and outputs packets to each flow. If these packets are merged, they will be output to output lines without their quality being guaranteed. Moreover, controlling the quality of packets by queuing a packet flow after merging will need complex high-speed processing.

The queue control means 41 therefore queues packets read out from the VIQ 3d to guarantee a band of 10 Gb/s for each flow and then outputs them to the merging means 42.

Figure 22:
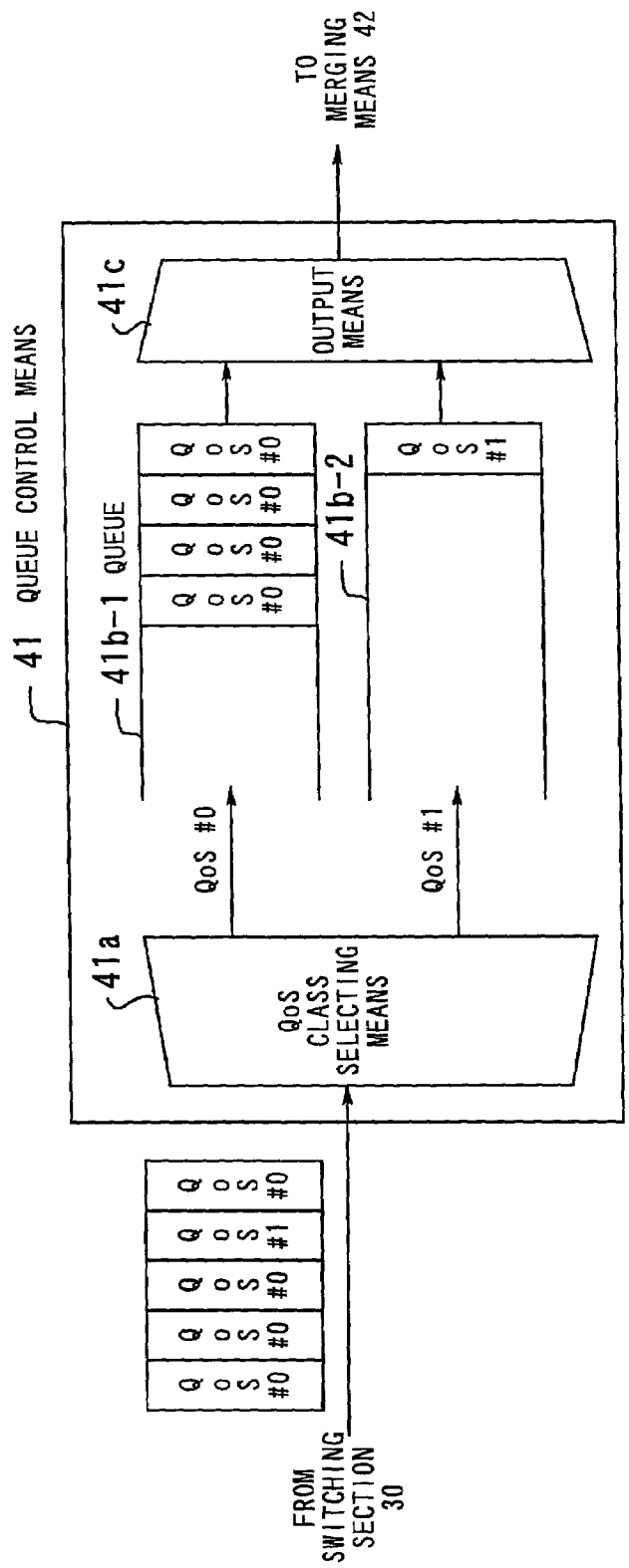
FIG. 22 is a view showing the structure of queue control means to which QoS control is added.

The queue control means 41 with QoS taken into consideration will now be described. FIG. 22 is a view showing the structure of the queue control means 41 to which QoS control is added. The queue control means 41 includes QoS class selecting means 41a, queues 41b-1 and 41b-2, and output means 41c.

The QoS class selecting means 41a selects packets it received according to QoS classes and outputs them. The queues 41b-1 and 41b-2 queue fixed-length packets allotted to them according to the QoS classes.

The output means 41c guarantees a band of, for example, 10 Gb/s and outputs packets on the basis of priorities assigned to QoS classes. That is to say, if there are packets of QoS #0 in the queue 41b-1, these packets are read out preferentially. After all of the packets of QoS #0 in the queue 41b-1 are read out, packets of QoS #1 stored in the queue 41b-2 are read out. In addition to this QoS priority control, the output means 41c guarantees a predetermined band and outputs packets to the merging means 42.

Figure 23:
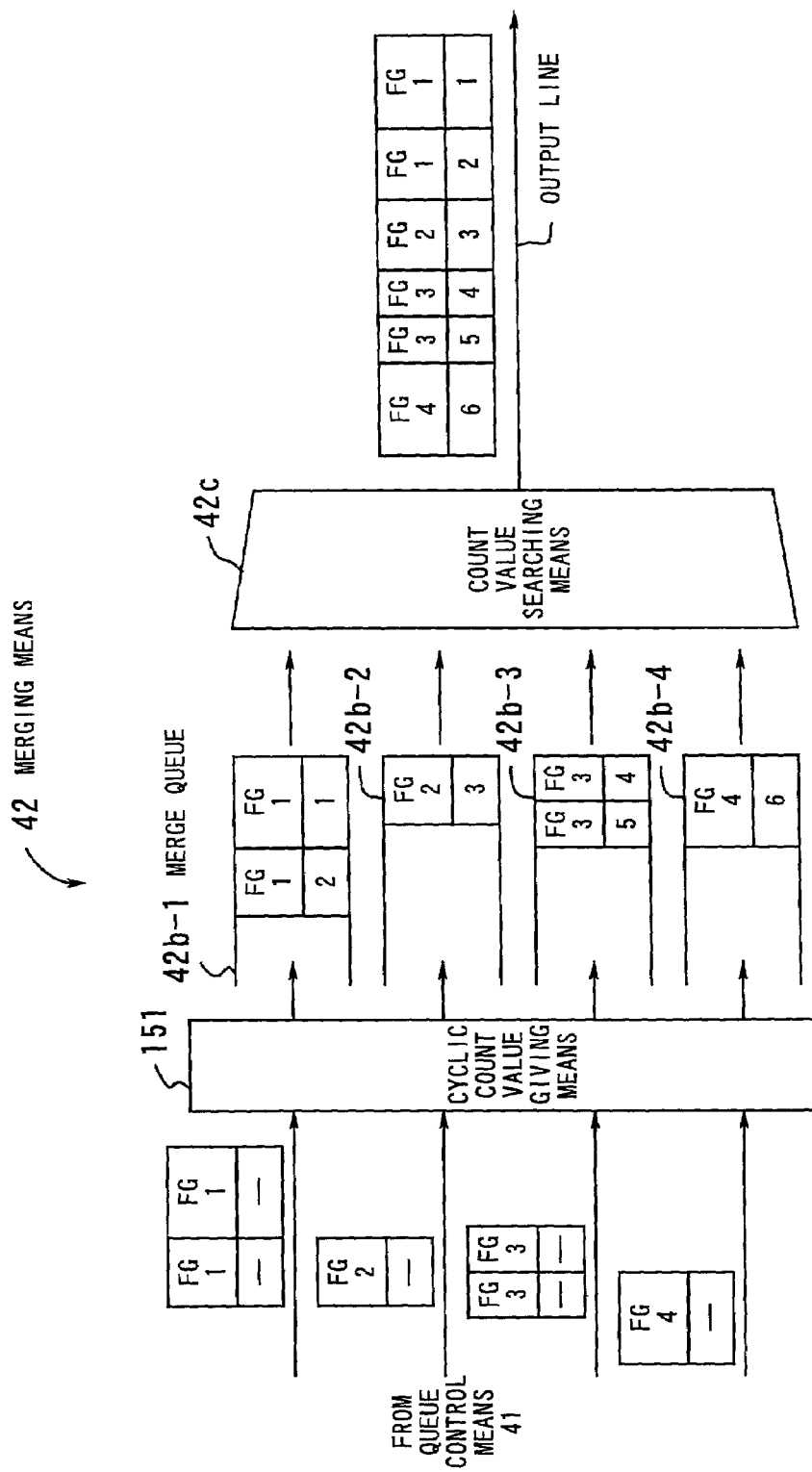
FIG. 23 is a view showing the structure of merging means.

The merging means 42 will now be described. FIG. 23 is a view showing the structure of the merging means 42. The merging means 42 includes cyclic count value giving means 42a, merge queues 42b-1 through 42b-4, and count value searching means 42c.

The cyclic count value giving means 42a cyclically counts packets output from the queue control means 41 in order of arrival and gives them cyclic count values. The merge queues 42b-1 through 42b-4 queue packets to which cyclic count values have been given. The count value searching means 42c compares the cyclic count values of packets output from the merge queues 42b-1 through 42b-4, merges the packets in an ascending order of the cyclic count values, and outputs them to an output line.

As stated above, the merging means 42 gives packets sent from the queue control means 41 cyclic numbers in order of arrival and merges and outputs the packets on the basis of these numbers. This enables the merging of packets without degrading their quality.

Figure 24:
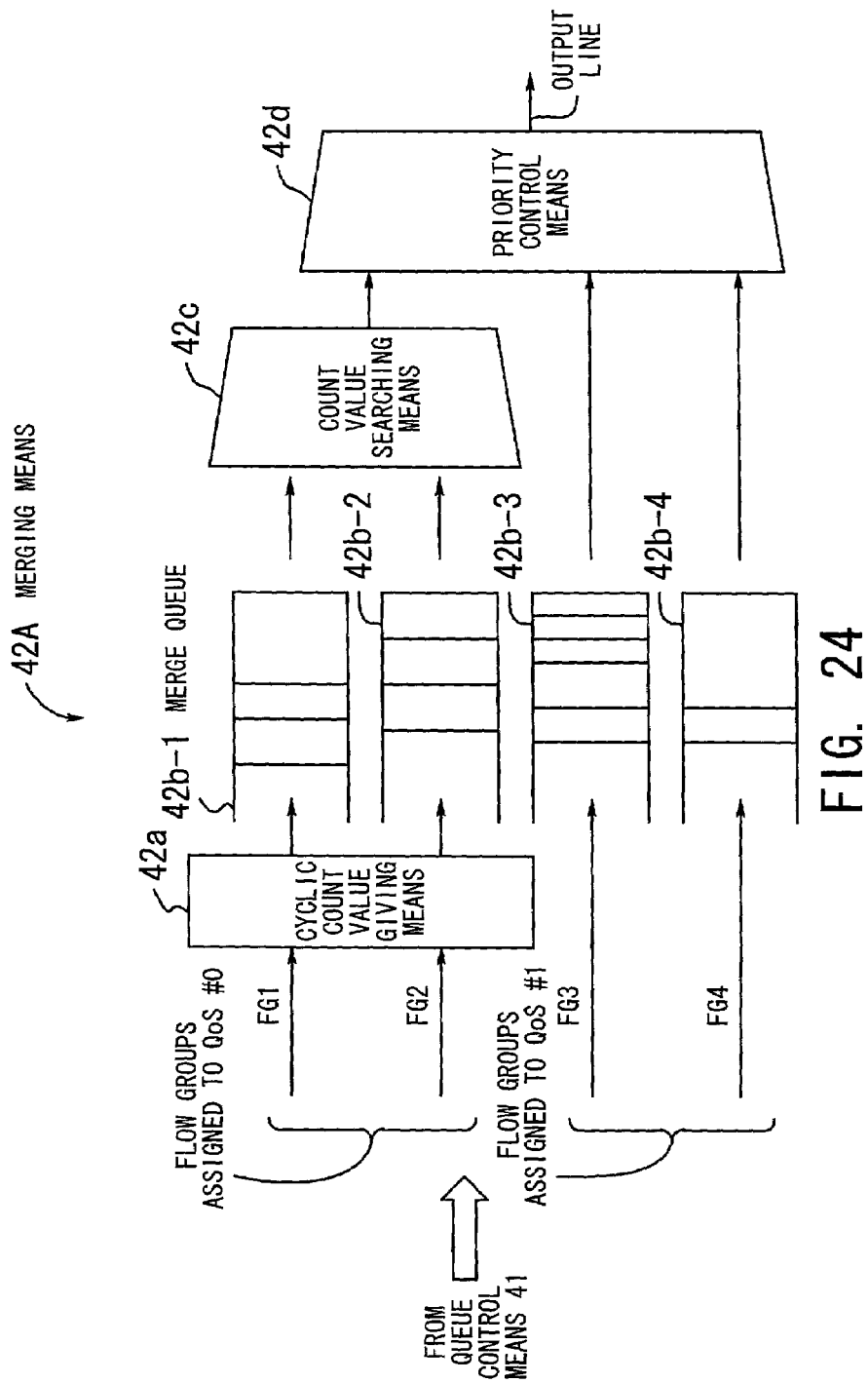
FIG. 24 is a view showing the structure of merging means to which QoS control is added.

Merging means with QoS taken into consideration will now be described. FIG. 24 is a view showing the structure of merging means to which QoS control is added. Merging means 42A will be applied in the case of using the flow group classifying means 12A (shown in FIG. 19) which classifies packets into flow groups corresponding to QoS classes.

It is assumed that QoS #0 and #1 correspond to band-guaranteed and best effort services respectively. Only between flow groups assigned to QoS #0, control over reading out packets will be exercised on the basis of the order of arrival by the use of cyclic count values. Between flow groups assigned to QoS #1, control over reading out packets will be exercised by the use of a round robin. Priority control means 42d exercises priority control over packets output from the count value searching means 42c and packets read out from the merge queues 42b-3 and 42b-4 by the use of a round robin and outputs the results. That is to say, if there is no output from the count value searching means 42c, packets read out from the merge queues 42b-3 and 42b-4 by the use of a round robin will be selected and output.

Figure 25:
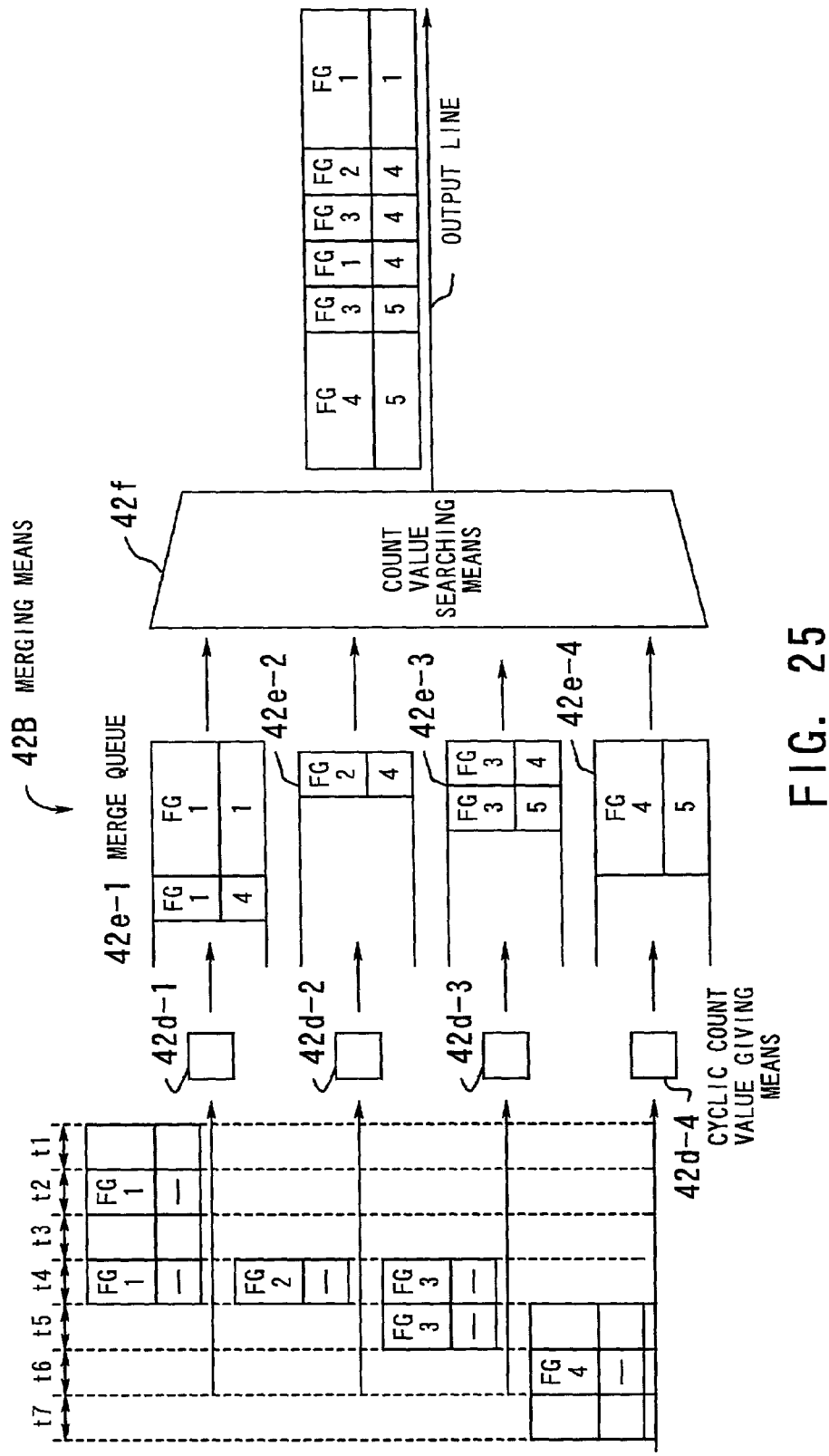
FIG. 25 is a view showing a first modification of the merging means.

A modification of the merging means 42 will now be described. FIG. 25 is a view showing a first modification of the merging means 42. Merging means 42B includes cyclic count value giving means 42d-1 through 42d-4, merge queues 42e-1 through 42e-4, and count value searching means 42f.

The cyclic count value giving means 42d-1 through 42d-4 are located on four parallel lines respectively. The cyclic count value giving means 42d-1 through 42d-4 cyclically count packets output from the queue control means 41 and give them cyclic count values. For example, the cyclic count value giving means 42d-1 receives empty data at time slots t1 and t3 and packet flows consisting of a packet of flow group FG1 at time slots t2 and t4. In this case, the cyclic count value of 1 is given to the packet of flow group FG1 which arrives first. Furthermore, this packet is extended so that it will occupy three time slots, and is stored in the merge queue 42e-1 located behind the cyclic count value giving means 42d-1. The cyclic count value of 4 is given to the packet of flow group FG1 which the cyclic count value giving means 42d-1 received at time slot t4.

The cyclic count value giving means 42d-2 receives a packet of flow group FG2 at time slot t4 and gives it the cyclic count value of 4. The cyclic count value giving means 42d-3 receives packets of flow group FG3 at time slots t4 and t5 respectively and gives them the cyclic count values of 4 and 5 respectively.

The cyclic count value giving means 42d-4 receives empty data at time slots t5 and t7 and a packet flow consisting of a packet of flow group FG4 at time slot t6 and gives this packet the cyclic count value of 5. Furthermore, this packet is extended so that it will occupy three time slots, and is stored in the merge queue 42e-4 located behind the cyclic count value giving means 42d-4.

The merge queues 42e-1 through 42e-4 queue packets to which cyclic count values have been given. The count value searching means 42f compares the cyclic count values of packets output from the merge queues 42e-1 through 42e-4, merges the packets in an ascending order of the cyclic count values, and outputs them to an output line. If there are packets with the same cyclic count value, they will be selected by the use of a round robin.

Figure 26:
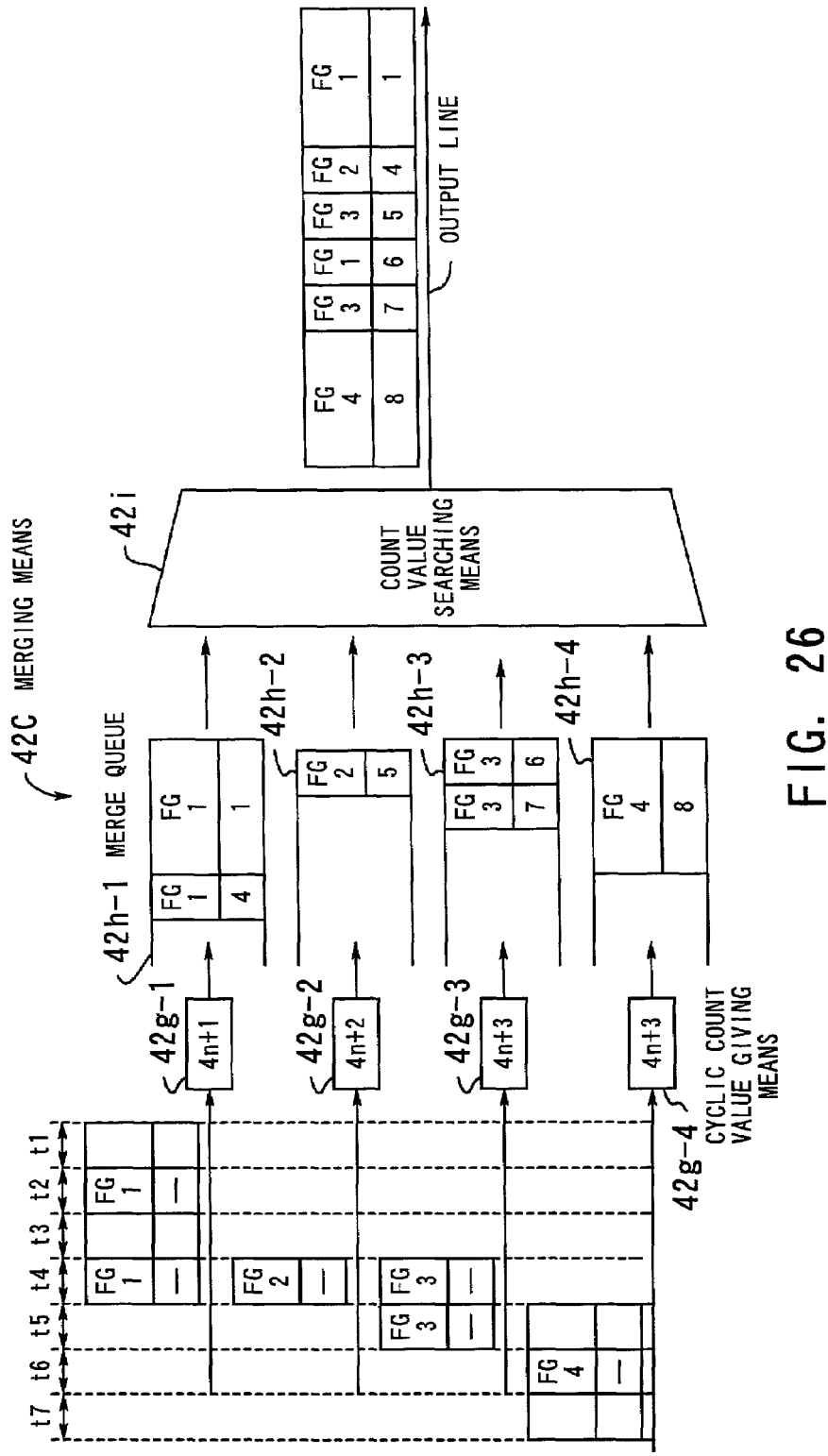
FIG. 26 is a view showing a second modification of the merging means.

FIG. 26 is a view showing a second modification of the merging means 42. Merging means 42C includes cyclic count value giving means 42g-1 through 42g-4, merge queues 42h-1 through 42h-4, and count value searching means 42i.

The cyclic count value giving means 42g-1 through 42g-4 are located on four parallel lines respectively. The cyclic count value giving means 42g-1 through 42g-4 cyclically count packets output from the queue control means 41 and give them cyclic count values. In this case, the cyclic count value giving means 42g-1 through 42g-4 give packets the cyclic count values of $4n+1$, $4n+2$, $4n+3$, and $4n+4$ ($n=0, 1, 2, \ldots$) respectively. As a result, the same cyclic count values do not exist and all the count value searching means 42i have to do is to read cyclic count values in ascending order. Control over reading out packets therefore can be exercised easily. Except for this, the structure and operation of the second modification are the same as those of the first modification.

As stated above, the merging means 42 gives packets sent from the queue control means 41 cyclic count values in order of arrival and merges and outputs the packets on the basis of these values. This enables the merging of packets without degrading their quality.

To prevent the above merge queues from overflowing, reading out packets from the queue control means 41 located in front of the merging means 42 can be stopped by back pressure control. Moreover, the merge queues are logically independent of the queues in the queue control means 41, but one physical buffer memory can be used for them to reduce the number of necessary memories.

Now, a method for reducing a load on the packet processing section 20 caused by a routing process will be described. Processes relating to Layer 3 performed by the packet processing section 20 include a filtering process and routing process and usually the latter will impose a greater load on the packet processing section 20 than the former (because the latter will need a larger look-up table for searching).

Therefore, to reduce a load caused by a routing process (to reduce the size of a look-up table), the flow group classifying means 12 first performs a hash process on packets with a destination address alone as a key and classifies the packets into flow groups. In this case, correspondences between the packet processing section 20 and flow groups are determined in advance. Next, the packet processing section 20 uses look-up tables consisting of destination addresses corresponding to these flow groups to perform a routing process.

For example, it is assumed that there are packets with the destination of a number between 0 and 40, that the flow group classifying means 12 performs a hash process on these packets with a destination address as a key, and that the flow group classifying means 12 classifies packets with the destination of a number between 0 and 10, packets with the destination of a number between 11 and 20, packets with the destination of a number between 21 and 30, and packets with the destination of a number between 31 and 40 into flow groups FG1, FG2, FG3, and FG4 respectively.

Moreover, correspondences between flow groups FG1 through FG4 and the packet processing sections 20-1 through 20-4 are determined in advance. The packet processing section 20-1 uses a look-up table consisting of destination addresses 0 through 10. Similarly, the packet processing section 20-2 through 20-4 use look-up tables consisting of destination addresses 11 through 20, 21 through 30, and 31 through 40 respectively.

This enables a packet processing section to use a smaller look-up table generated by dividing according to flow groups. That is to say, one packet processing section does not need to use a large look-up table consisting of destination addresses 0 through 40. As a result, a load on the packet processing section 20 caused by a routing process can be reduced and the size of hardware can also be reduced.

Figure 27:
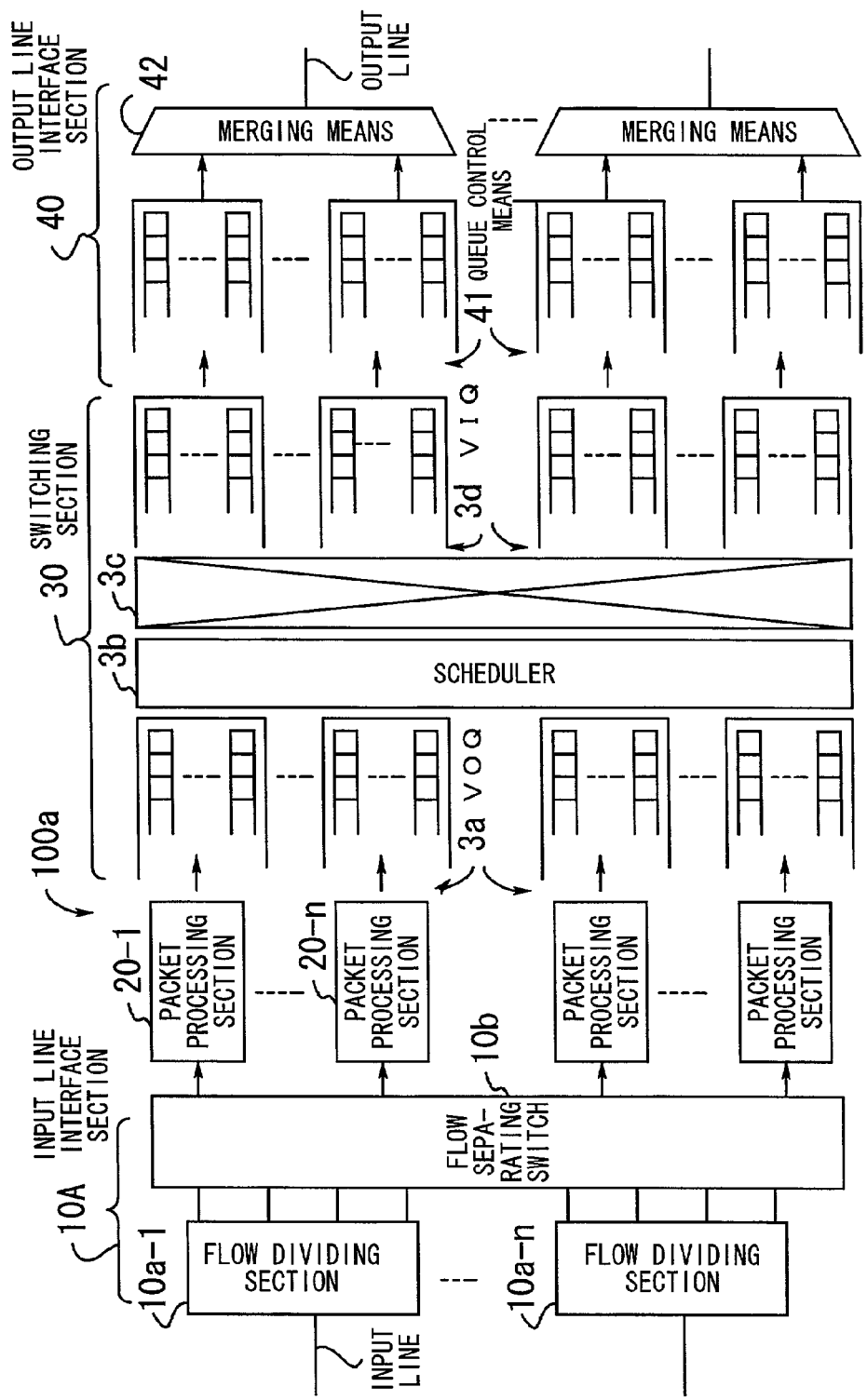
FIG. 27 is a view showing the structure of a modification of the packet communication device.

A modification of the packet communication device 100 according to the present invention will now be described. FIG. 27 is a view showing the structure of a modification of the packet communication device 100. A packet communication device 100*a* accommodates input lines by the use of an input line interface section 10A. Except for this, the structure of the modification is the same as that of the packet communication device 100 shown in FIG. 21.

The input line interface section 10A includes flow dividing sections 10*a*-1 through 10*a*-*n* (collectively referred to as a "flow dividing section 10*a*") located for n input lines respectively and a flow separating switch 10*b*. The flow dividing section 10*a* includes the packet allotting means 11, flow group classifying means 12, sequence number giving means 13, and buffering means 14 described above.

The flow separating switch 10*b* is also used as the crossbar switch 3*c* in the switching section 30. The crossbar switch 3*c* is used to allot packets to flow groups (data will pass through the same switch twice).

In the packet communication device 100 shown in FIG. 21, the flow separating switch 15 is located for each input line. In the packet communication device 100*a*, however, one crossbar switch 3*c* is used to fulfill the two functions of separating packets according to flow groups and switching packets. As a result, the size of circuits can be reduced.

Furthermore, in the packet communication device 100, there is a one-to-one relationship between input lines and the packet processing section 20. In the packet communication device 100*a*, however, one of the packet processing section 20 located can be selected freely.

Therefore, if one of the packet processing section 20 fails or a great processing load falls on one of the packet processing section 20, packets allotted to flow groups can be sent to another packet processing section 20. This enables to perform a redundant process efficiently.

As described above, the input line interface device 10 according to the present invention divides a variable-length packet, such as an IP packet, into fixed-length packets, classifies them into flow groups, and accommodates them. This enables to accommodate packets from a high-speed input line efficiently.

Further, the packet communication device 100 according to the present invention performs an input process in the input line interface section 10, performs processes relating to layer 3 on each flow group in parallel, performs switching, merges packets of a plurality of flow groups with the quality of each flow group maintained, and outputs the packets to high-speed output lines. As a result, a high-speed large-capacity routing unit can be realized.

As has been described in the foregoing, an input line interface device according to the present invention divides a variable-length packet, allots the divided packets to parallel lines, classifies packets into flow groups on each parallel line, exercises sequence control over packets in the flow groups, and outputs the packets according to the flow groups. This enables to accommodate packets from a high-speed input line efficiently and to reduce a load on a back stage caused by processing.

Further, a packet communication device according to the present invention accommodates packets from a high-speed line in an input line interface section, processes them, switches them, merges them, and outputs them. This enables high-speed large-capacity routing control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An input line interface device for exercising interface control over packets on the input line side, the device comprising:
   a packet allotting section for dividing a variable-length packet into fixed-length packets, adding fixed-length header information to the fixed-length packets, allotting the fixed-length packets to parallel lines, and outputting the respective fixed-length packets in a time slot;
   a flow group classifying section for classifying the fixed-length packets into flow groups on each of the parallel lines;
   a sequence number giving section for giving the fixed-length packets sequence numbers corresponding to or independent of the flow groups;
   a buffering section for buffering the fixed-length packets to which the sequence numbers have been given to exercise sequence control over the fixed-length packets in the flow groups; and
   a flow separating switch for separating the fixed-length packets according to the flow groups and outputting the fixed-length packets;
   wherein the packet allotting section divides the variable-length packet into (A×B) bytes and divides again a divided packet of (A×B) bytes into ID bytes and allots the fixed-length packets which are divided packets of B bytes to the parallel lines when the variable-length packet arrives, fills an empty area with padding when there is the empty area in the time slot, and stops allotting when the variable-length packet does not arrive, where A is the number of parallel lines and B is a time slot.

2. The input line interface device according to claim 1, further comprising a fixed-length header information generating section located in front of or behind the packet allotting section for separating header information and a payload included in the variable-length packet, storing the payload in a memory, and generating the fixed-length header information including an address in the memory where the payload is stored and information extracted from the header information.

3. The input line interface device according to claim 1, wherein the flow group classifying section classifies the fixed-length packets into the flow groups corresponding to QoS classes.

4. The input line interface device according to claim 1, wherein the buffering section buffers the fixed-length packets according to QoS classes.

5. The input line interface device according to claim 1, wherein the sequence number giving section gives the sequence numbers so that the same numbers will not appear.

6. A packet communication device for exercising communication control over packets, the device comprising:
   an input line interface unit including:
      a packet allotting section for dividing a variable-length packet into fixed-length packets, adding fixed-length header information to the fixed-length packets, allotting the fixed-length packets to parallel lines, and outputting the respective fixed-length packets in a time slot, a flow group classifying section for classifying the fixed-length packets into flow groups on each of the parallel lines, a sequence number giving section for giving the fixed-length packets sequence numbers corresponding to or independent of the flow groups, a buffering section for buffering the fixed-length packets to which the sequence numbers have been given to exercise sequence control over the fixed-length packets in the flow groups, and a flow separating switch for separating the fixed-length packets according to the flow groups and outputting the fixed-length packets;

wherein the packet allotting section divides the variable-length packet into (A×B) bytes and divides again a divided packet of (A×B) bytes into B bytes and allots the fixed-length packets which are divided packets of B bytes to the parallel lines when the variable-length packet arrives, and fills an empty area with padding when there is the empty area in the time slot, and stops allotting when the variable-length packet does not arrive where A is the number of parallel lines and B is a time slot;

a packet processing unit for processing the input fixed-length packets of the same flow group;

a switching unit for exercising switching control to output to output lines; and an output line interface unit including:

a queue control section for queuing the fixed-length packets on which a switching process has been performed in order to maintain the quality of the fixed-length packets in the flow groups, and a merging section for merging the fixed-length packets and outputting the fixed-length packets to the output lines;

wherein the merging section gives the fixed-length packets output from the queue control section cyclic count numbers in order of arrival, reads out the fixed-length packets in ascending order of the cyclic count numbers, and merges the fixed-length packets.

7. The packet communication device according to claim 6, wherein the queue control section queues the fixed-length packets according to QoS classes.

8. The packet communication device according to claim 6, wherein the merging section gives the cyclic count numbers so that the same numbers will not appear, and merges the fixed-length packets.

9. The packet communication device according to claim 6, wherein the merging section merges the fixed-length packets according to QoS classes.

10. The packet communication device according to claim 6, wherein the flow group classifying section performs a hash process on the fixed-length packets with a destination address as a key and classifies the fixed-length packets into flow groups, further wherein the packet processing unit has look-up tables consisting of destination addresses corresponding to the flow groups.

11. The packet communication device according to claim 6, wherein the flow separating switch is also used as a switch used in the switching unit.

* * * * *